United States Patent [19]

Smith

[11] 3,988,979

[45] Nov. 2, 1976

[54] FRONT END LOADER

[75] Inventor: Fred T. Smith, Newark, Ohio

[73] Assignee: Sargent Industries, Inc., Los Angeles, Calif.

[22] Filed: Aug. 12, 1974

[21] Appl. No.: 497,129

[52] U.S. Cl. .................................. 100/50; 100/250; 100/269 R; 100/295; 214/82

[51] Int. Cl.[2] .................... B30B 15/16; B30B 15/06; B60P 1/00

[58] Field of Search ............... 214/82, 83.3; 100/50, 100/269 R, 295, 240, 250, 214, 218, 229 A, 52

[56] References Cited

UNITED STATES PATENTS

| | | | |
|---|---|---|---|
| 687,092 | 11/1901 | Webb | 100/232 |
| 2,865,286 | 12/1958 | Newell | 214/82 X |
| 2,912,128 | 11/1959 | Kamin | 214/82 |
| 3,161,305 | 12/1964 | Ferrari et al. | 214/82 |
| 3,229,622 | 1/1966 | French et al. | 100/214 |
| 3,257,012 | 6/1966 | Berolzheimer | 214/82 |
| 3,303,946 | 2/1967 | Wilkins | 100/295 X |
| 3,384,007 | 5/1968 | Boje et al. | 100/295 X |
| 3,386,374 | 6/1968 | Tezuka | 100/295 X |
| 3,603,245 | 9/1971 | Pioch | 100/50 |
| 3,608,476 | 9/1971 | Price et al. | 100/50 |
| 3,621,775 | 11/1971 | Dedio et al. | 100/295 X |
| 3,728,849 | 4/1973 | Lundahl | 100/295 X |
| 3,734,005 | 5/1973 | Vogel | 100/295 X |
| 3,734,316 | 5/1973 | Worthington | 214/82 |
| 3,802,337 | 4/1974 | Hilaire | 100/295 |
| 3,802,585 | 4/1974 | Churchman | 214/82 |
| 3,865,260 | 2/1975 | Wieschel | 214/82 |

*Primary Examiner*—Billy J. Wilhite
*Attorney, Agent, or Firm*—Ellsworth R. Roston

[57] ABSTRACT

A refuse compactor includes a refuse storage body, a compaction panel movable within the storage body to give refuse within said body an initial pack and a stuffer panel movable within said body to provide the refuse with a secondary pack.

The stuffer panel may apply a higher packing pressure to the refuse than the compaction panel.

The secondary pack applied to refuse by the stuffer panel has an upward component of movement with a greater upward inclination than the packing force applied to the refuse through movement of the compaction panel thereby offsets the gravitational effect of increased densification of refuse in the lower portion of the refuse storage body.

First and second hydraulic motor means are respectively connected to the compaction panel and the stuffer panel. First control means govern the flow of hydraulic fluid to the first motor to provide movement to the compaction panel until the compaction resistance of refuse contacted by the compaction panel raises the pressure of hydraulic fluid within the first motor means to a predetermined level. Second control means control the flow of hydraulic fluid to the second motor means to actuate the stuffer panel when the pressure of hydraulic fluid within the first motor means has reached said predetermined pressure level and to prevent or to stop the flow of hydraulic fluid to the second motor means when the pressure of hydraulic fluid within the first motor means is less than the predetermined level. The compaction panel and stuffer panel are thereby moved alternately in providing increased compaction to refuse within the storage body.

70 Claims, 20 Drawing Figures

10
30
30'
36
54
54'
56
60
62
64
68
69
69'
70
70'
71
71'
73
75

FRONT END LOADER

BACKGROUND OF THE INVENTION

The refuse collection business is one of the most rapidly growing areas of the economy. There is a correlation between the total population and the amount of refuse disposed of by the population. In addition, there is a correlation between the industrial level of a country and the amount of refuse disposed of by its population. As a country becomes more industrialized, its citizens become more literate and more affluent. These changes may produce a relatively large increase in the amount of disposable refuse, both in the form of written material such as newspapers, magazines, etc., and also in the form of disposable items such as bottles and containers of various types.

Several types of refuse collection vehicles are commonly used in collecting refuse. Rear loading vehicles are generally used in picking up refuse from homes with the refuse in a trash can or in a plastic bag which is dumped into a hopper positioned at the rear of the vehicle.

Front end loading vehicles, or front end loaders, are commonly used in picking up refuse from locations such as schools, factories, office buildings, etc. In this type of operation, the refuse is initially placed in a large refuse container which may be used as a storage bin for the refuse until the container becomes filled. The filled container is then emptied by a front end loader with the container being picked up by lifting arms and fork arms which engage the container to raise it above a storage body positioned on the refuse collection vehicle. After being raised above the refuse storage body, the container is inverted to dump its contents into the refuse storage body and the container is then returned to the ground. In picking up the container, the container is generally positioned forwardly of the refuse collection vehicle and is lifted over the cab of the vehicle to a position above the refuse storage body. The mode of operation of the refuse collection apparatus, with the refuse container positioned in front of the vehicle and being raised over the cab of the vehicle during pick-up, accounts for the name "front end loader."

Through use of a front end loader, the refuse, after being dumped into the storage body for the vehicle, is compacted through rearward movement of a compaction panel within the storage body. In its movement, the compaction panel is positioned forwardly of the opening into the refuse storage body for the vehicle. Then, after the deposit of refuse in the body through the opening, the panel is moved rearwardly to compact the refuse against a tailgate which is pivotally mounted on the storage body to close a rear opening in the storage body. After rearward movement of the compaction panel to pack the refuse, the panel is moved forwardly to pick up new refuse as it is dumped through the opening into the storage body, etc.

After a period of time, the refuse storage body for the collection vehicle will become filled with refuse. It is then necessary for the refuse collection vehicle to make a trip to a dumping point to unload the refuse. This is accomplished by moving the tailgate for the front end loader to a raised position and then ejecting the refuse from the refuse storage body by moving the panel rearwardly within the refuse storage body to push the refuse out of the rear opening.

The time required for unloading the refuse from the front end loader is lost time since the refuse collection apparatus merely performs as a truck during its trip to and from the dumping site. To reduce this lost time to a minimum, it is most desirable that the front end loader have a large capacity. The capacity of the front end loader could, for example, be increased simply through the expedient of making the refuse storage container larger. However, this is not a satisfactory solution since the size of a refuse collection vehicle may be dictated to a large extent by its ease in handling since the vehicle must be capable of picking up refuse containers behind office buildings and in alleys, etc. Thus, the only practical way to increase the capacity of the front end loader is to improve its efficiency such that it is able to compact refuse within the refuse storage body to a higher density with the storage body then being able to hold a larger quantity of refuse.

In the pick-up of refuse with a front end loader, a considerable amount of time is spent in moving the front end loader from one pick-up location to another. During these moves, when the front end loader is functioning as an over-the-road vehicle, the packing mechanism of present front end loaders is essentially inoperative. As described, the packing mechanism functions simply through rearward movement of a compaction panel within the refuse storage body with the panel then being moved forwardly after its rearward movement has been completed. Since the movement of the panel within the refuse storage body is relatively rapid, packing of the refuse may be completed within a relatively short time. Thus, when the front end loader is moved to a new pick-up location, the position of the panel within the storage body is generally fixed and the packing mechanism is not in operation.

During the pick-up of refuse by a front end loader, the refuse may be blown by the wind while being dumped from the inverted refuse container into the refuse storage body. This is very undesirable since it creates a source of litter at the refuse pick-up point. Additionally, when the refuse storage body is substantially full, refuse may extend upwardly through the opening in the storage body. This is also undesirable since the refuse can then be dislodged or blown from the storage body when the refuse collection vehicle is moved over the road to another location.

During the lifting of a loaded refuse container by a front end loader, it is most desirable that the position of the container be maintained reasonably horizontal. Otherwise, the container may be able to slide relative to the fork arms which support it which could result in dropping of the container. Also, during lifting of the refuse container, it is most desirable that some means be provided to prevent the container from being dropped if there should be a failure in the supplying of hydraulic fluid to the mechanism used in operating the lifting arms or the fork arms which engage the container.

During the packing of refuse within a refuse storage body, liquid will be dispelled from liquifiable items within the refuse such as vegetables, fruit, and other waste materials. The liquid which is formed may create problems through drainage from the refuse storage body. Thus, it would be most desirable to provide some means for retaining liquid within the refuse storage body such that the liquid does not drain from the storage body.

When the tailgate is in a lowered position relative to the refuse storage body, the tailgate must be locked, in some manner, to the storage body. This may create problems when it is desired to raise the tailgate to discharge refuse through the rear opening in the storage body. Thus, for example, it may be necessary to manually unlock the tailgate from the refuse storage body before moving of the tailgate to a raised position. This would be undesirable since it might require that the operator leave the vehicle cab to unlock the tailgate before actuating the mechanism to move the tailgate to a raised position. Also, by having the locking mechanism separate from the mechanism for lifting the tailgate, the tailgate might be inadvertently left unlocked after being moved to a lowered position in contact with the refuse storage body. This could create a safety hazard since the tailgate could then open when refuse within the storage body was moved rearwardly and packed against the tailgate. For these reasons, it would be desirable to have a locking mechanism for the tailgate which would function in combination with the mechanism for lifting of the tailgate. The operator would then not have to leave the vehicle cab to unlock the tailgate and there would be no possibility of inadvertently leaving the tailgate unlocked after moving the tailgate to a lowered position in engagement with the refuse storage body.

Another aspect of the invention concerns a refuse collection apparatus having a refuse storage body with a rear opening and a tailgate positioned adjacent the rear opening for movement between a raised position to expose the opening and a lowered position to close the opening. The tailgate has a lower member which is downwardly inclined in the direction of the storage body and the storage body has a contact surface adjacent the rear opening. The storage body has an inner bottom surface and the lower tailgate member and contact surface project below said bottom surface with the lower tailgate member and contact surface in contacting relation to form a liquid receiving well when the tailgate is in its lowered position. Sealing means are positioned between the downwardly inclined tailgate member and the downwardly projecting contact surface which form the liquid receiving well.

SUMMARY OF THE INVENTION

In accord with the present invention, I have provided a refuse compactor in which refuse may be sequentially packed within a refuse storage body to increase the densification of the refuse within the body. The refuse storage body is, then, capable of holding a larger quantity of refuse. When the refuse storage body is mounted on a vehicle, for example as a component part of a front end loader, the capacity of the front end loader is increased and there is less lost time in unloading refuse from the refuse storage body at a dumping point.

The refuse compactor may include a compaction panel which is movable within a storage body to give refuse within the storage body an initial pack. A stuffer panel may also be provided within the body to give the refuse in the body a secondary pack. Control means are provided to alternately move the compaction panel and the stuffer panel such that the refuse is compacted sequentially within the storage body through movement of the said panels.

The movement of the stuffer panel preferably applies a higher packing pressure to the refuse than the packing pressure applied to the refuse through movement of the compaction panel. Also, the compaction surface of the stuffer panel is preferably smaller than that of the compaction panel such that the packing force applied through actuation of the stuffer panel is applied to the refuse over a smaller contact area.

Another aspect of the invention concerns a refuse compactor with a refuse storage body, a compaction panel movable within the storage body to give refuse an initial pack and a stuffer panel movable within the body to give refuse a secondary pack. The storage body has an upper and lower portion and the secondary pack applied to refuse through movement of the stuffer panel has an upward component of movement having greater upward inclination than the packing force applied to the refuse through movement of the compaction panel. In this manner, the normal gravitational tendency of the refuse to be more dense in the lower portions of the refuse storage body is offset by the upwardly directed packing force applied to the refuse by movement of the stuffer panel.

In actuation of the stuffer panel in either of the above described embodiments of the invention, the stuffer panel preferably forms a cavity in the refuse on movement of the stuffer panel to an extended position. The formation of the cavity preferably reduces the area on the compaction surface of the compaction panel which is in contact with compacted refuse. By reducing the area of the compaction surface of the compaction panel which is contacted by compacted refuse, the force per unit area applied to refuse by the compaction panel is, thereby, increased. This may assist in the sequential packing of the refuse by alternate movement of the compaction panel and the stuffer panel with the movement of the stuffer panel thereby making it easier to further compact the refuse through movement of the compaction panel.

Preferably, the stuffer panel is pivotally mounted on the compaction panel with the compaction surface of the stuffer panel being rotated upwardly and rearwardly with respect to the compaction surface of the compaction panel when the stuffer panel is moved from a retracted to an extended position. Also, the stuffer panel is preferably shaped and positioned such that the movement of the stuffer panel has an upward component of movement which increases in its extent of upward inclination during movement of the stuffer panel from a retracted to an extended position.

The movement of the compaction panel and stuffer panel is preferably controlled hydraulically. Thus, in another aspect of the invention, a compaction panel and stuffer panel are movable within a refuse storage body with first hydraulic motor means connected to the compaction panel and second hydraulic motor means connected to the stuffer panel. First control means may permit the flow of hydraulic fluid to the first motor means to provide movement to the compaction panel until the compaction resistance of refuse contacted by the compaction panel raises the pressure of hydraulic fluid within the first motor means to a predetermined level. Second control means may be employed for controlling the flow of hydraulic fluid to the second motor means with the second control means permitting the flow of hydraulic fluid to the second motor means to actuate the stuffer panel when the pressure of hydraulic fluid within the first motor means has reached said predetermined level. Also, the second control means may function to prevent or to stop the flow of hydraulic fluid to the second motor means when the pressure of hydraulic fluid within the first motor means is less than said predetermined level.

The second motor means and stuffer panel are, thus, actuated when the pressure in the first motor means has reached said predetermined level with the actuation of the stuffer panel reducing the compaction resistance of refuse in contact with the compaction panel. Due to the decrease in the compaction resistance of refuse in contact with the compaction panel, the compaction panel may then undergo further movement. On further movement of the compaction panel, the pressure of hydraulic fluid within the first motor means drops below said predetermined level and additional hydraulic fluid may be supplied to the first motor means to provide additional movement to the compaction panel until the pressure of fluid within the first motor means reaches said predetermined level. In this manner, the compaction panel and stuffer panel may be moved alternately in providing increased compaction to refuse within the storage body.

In addition, third control means may be employed to control the direction of flow of hydraulic fluid to the second motor means. The third control means may function to alternately change the flow direction of fluid to the second motor means. This has the effect of alternately moving the stuffer panel to an extended position and then to a contracted position, etc. The stuffer panel may then function to supply a multiple of secondary packing strokes to refuse within the storage body.

In a hydraulic system for controlling movement of the compaction panel and stuffer panel, the first motor means and second motor means may be connected together hydraulically in series. Preferably, the first motor means is positioned ahead of the second motor means with hydraulic fluid flowing through the first motor means before flowing to the second motor means. Also, the second control means preferably functions to maintain the pressure of hydraulic fluid within the first motor means at or near said predetermined level when the pressure of fluid within the first motor means has reached this level.

Another aspect of the invention concerns a front end loader having a closure means positioned adjacent an upper opening into a refuse storage body mounted on a supporting vehicle. The closure means is shaped and positioned to shield the opening from the wind when the closure means is in its open position. Also, means are provided to exert a downward packing force on the closure means in moving the closure means from its open to its closed position. The closure means then functions to exert a positive downward packing force on refuse which is contacted by the closure means during its movement to a closed position.

Preferably, the closure means is actuated between an open and a closed position in response to movement of means such as lifting arms on the front end loader for picking up a refuse container. Thus, when the means for picking up a refuse container is moved upwardly to raise the container to a position for dumping, the closure means may be actuated to an open position. Conversely, when the means for picking up a refuse container is lowered, after dumping of the contents of the container, the closure means may be actuated to a closed position.

Preferably, the closure means includes a pair of doors positioned on either side of the opening into the refuse storage body. Also, the doors preferably each include a sharp edge with the sharp edges cooperating to exert a shearing force on refuse which projects between the doors during their closing.

A further aspect of the invention concerns a front end loader with a refuse storage body having an upper opening and lifting arms pivotally mounted with respect to the storage body and vehicle for raising and lowering of the lifting arms. Fork arms are pivotally connected to the distal ends of the lifting arms with first hydraulic motor means connected to the lifting arms and second hydraulic motor means connected to the fork arms. Means are provided to feed hydraulic fluid to the second motor means in response to movement of the lifting arms to maintain the fork arms in a substantially horizontal position as the lifting arms are undergoing movement. In this manner, the loaded refuse container which is supported by the fork arms is maintained in a substantially horizontal position while it is being lifted.

Means may also be provided to actuate the second motor means independently of the actuation of the first motor means. Thus, the second motor means may be actuated to rotate the fork arms with respect to the lifting arms in inverting a loaded refuse container above an opening into the storage body while the lifting arms are held in a fixed position. Preferably, means are provided to maintain a pressure of hydraulic fluid within the first motor means which is sufficient to prevent lowering of the lifting arms while supporting a load if there should be a failure in the supplying of hydraulic fluid to the first motor means. Also, means are preferably provided to maintain a pressure of hydraulic fluid within the second motor means which is sufficient to prevent lowering of the fork arms while supporting a load if there should be a failure in the supplying of hydraulic fluid to the second motor means.

A still further aspect of the invention concerns a refuse collection apparatus having a refuse storage body with a rear opening and a tailgate pivotally positioned with respect to the storage body for closing the rear opening. Hydraulic motor means may be provided for rotating the tailgate from a lowered, locked position with respect to the storage body to a raised, unlocked position during discharge of refuse from the storage body through the rear opening. In locking the tailgate to the storage body, lever means may be pivotally mounted on the storage body with the motor means being connected to the lever means and also to the tailgate. A keeper member may be secured to the tailgate and a latching member may be pivotally mounted on the storage body with the latching member being shaped and positioned to engage the keeper member when the tailgate is in a lowered position in engagement with the storage body to lock the tailgate to the storage body. Means are provided to transmit rotational movement of the lever means to the latching member with the lever means undergoing rotational movement on actuation of the motor means. The rotational movement of the latching member moves the latching member out of engagement with the keeper member. As a result, on actuation of the motor means to move the tailgate to a raised position, the tailgate is first unlocked from the storage body.

BRIEF DESCRIPTION OF THE DRAWINGS

In illustrating an embodiment of the invention, reference is made to the accompanying drawings in which.

DETAILED DESCRIPTION

Figure 1:
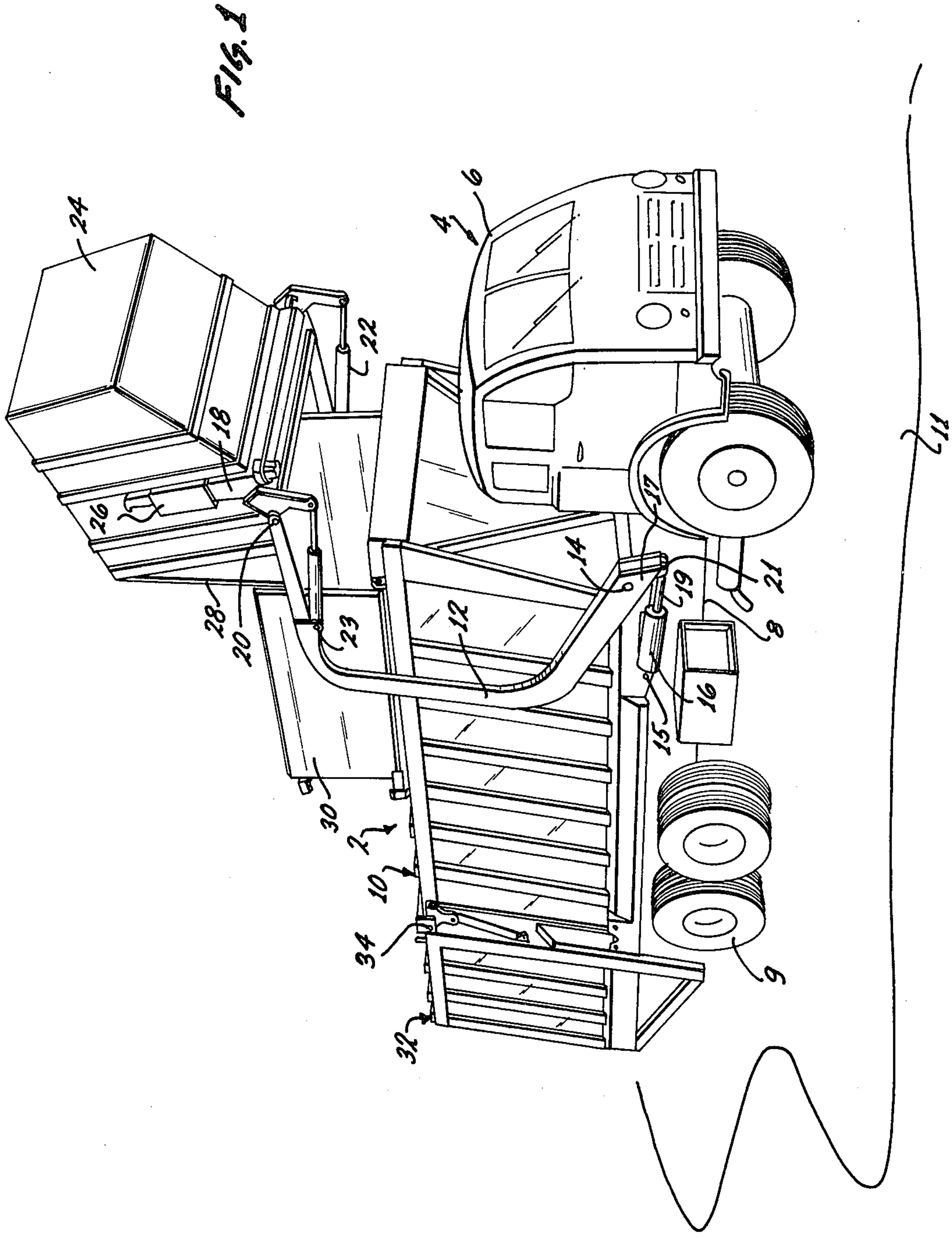
FIG. 1 is a pictorial representation of a front end loader with the lifting arms for the loader in a raised position to invert a loaded refuse container above an opening in a refuse storage body supported upon a truck chassis.

FIG. 1 illustrates a front end loader 2 which is mounted on a wheeled vehicle 4 that includes a cab 6, a chassis 8 and wheels 9 supporting the chassis. A refuse storage body 10 for the front end loader 2 is mounted on chassis 8 while wheels 9 contact a ground surface 11.

Lifting arms 12 may be mounted on the storage body 10 or on the chassis 8 through pivotal mountings 14. Hydraulic cylinders 16 supported through pivotal mountings 15 are connected to lever arm portions 17 of lifting arms 12 through piston rods 19. The piston rods 19 are secured to lever arm portions 17 through pivotal mountings 21 with expansion of the hydraulic cylinders 16 causing upward rotational movement of the lifting arms 12 while contraction of the cylinders 16 causes downward rotational movement of the lifting arms.

Fork arms 18 are positioned adjacent the outer ends of the lifting arms 12 through pivotal mountings 20 with the fork arms being rotatable with respect to the lifting arms through expansion or contraction of hydraulic cylinders 22 secured to the lifting arms through pivotal mountings 23. As illustrated, the lifting arms 12 and fork arms 18 are used to engage a refuse container 24 with the fork arms in engagement with fork slots 26 positioned on either side of the refuse container.

With the fork arms 18 engaging the fork slots 26, the refuse container 24 is lifted over the cab 6 through upward rotation of the lifting arms 12. When the refuse container 24 is lifted to a point adjacent an upper opening into the storage body 10, the fork arms 18 are rotated with respect to the lifting arms 12 so as to invert the container 24 and to dump its contents into the refuse storage body. During inversion of the refuse container 24, a container lid 28 which may be pivotally secured to the refuse container is rotated to an open position to permit dumping of the contents of the refuse container.

The upper opening into the refuse storage body is normally closed by doors 30. However, as will be described, the upward movement of the lifting arms 12 causes the doors 30 to open at a predetermined point so that the doors serve as wind screens during dumping of refuse from the refuse container 24. With the doors 30 positioned as shown in FIG. 1, the doors serve to prevent the refuse from being blown by the wind as it is dumped from the refuse container 24.

As illustrated, a tailgate 32 is secured to the rearward portion of the refuse storage body 10 through pivotal mountings 34. The tailgate 32 serves a number of functions, as will be described. However, the principal function of the tailgate 32 is to close a rearward opening in the refuse storage body 10 to permit the packing of refuse within the storage body. Then, after the refuse storage body 10 becomes filled with refuse, the refuse is ejected from the storage body by opening of the tailgate 32.

Figure 2:
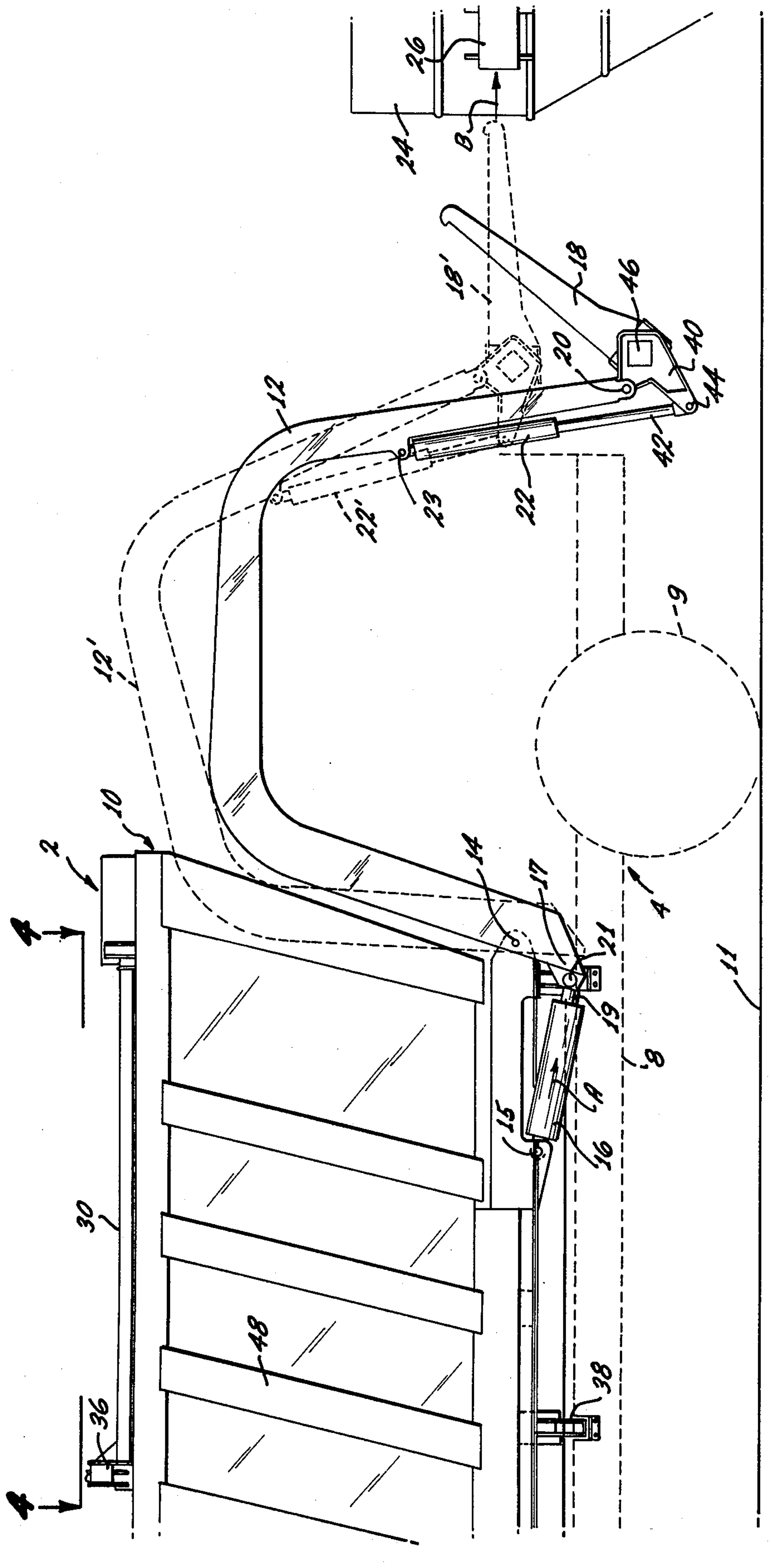
FIG. 2 is a partial side elevation view of the front end loader illustrating the movement of the lifting arms with fork arms pivotally connected to the distal ends of the lifting arms to engage fork slots positioned on the sides of a refuse container.

Turning to FIG. 2, which is a partial side elevational view of the front end loader 2, the position of the lifting arms 12 and fork arms 18 is shown in detail to demonstrate their movement during the initial engagement of the fork arms with the fork slots 26 in refuse container 24. The lifting arms 12 are shown in solid line drawing in their lowered position as, for example, when the front end loader 2 is being moved over the highway. With the lifting arms in their lowered solid line position 12, the fork arms may be in an upwardly inclined position shown in solid line drawing as 18 so as to not extend very far in front of the vehicle. Also, however, if desired, the lifting arms 12 may be in a partially raised position for movement of the front end loader 2 over the highway with the fork arms 18 being positioned above or partially above the vehicle cab 6. This puts the fork arms 18 out of the way such that they do not extend in front of the front end loader 2 to cause a traffic hazard.

As illustrated, the doors 30 which close the opening into the top of the refuse storage body 10 may be secured to the refuse storage body through pivotal mountings 36. Also, the refuse storage body 10 may be secured to chassis 8 through a plurality of chassis connectors 38.

When the fork arms 18 are to be engaged with the fork slots 26 of refuse container 24, the lifting arms 12 may be pivoted slightly upward through expansion of hydraulic cylinders 16 in the direction indicated by arrow A. The fork arms 18, as described, are pivoted with respect to the lifting arms 12 through extension or contraction of hydraulic cylinders 22. The hydraulic cylinders 22 are connected to lever arm braces 40 which are secured to the outer ends of lifting arms 12 through pivotal mountings 20 and include piston rods 42 secured through pivotal connections 44 to the lever arm braces. A cross brace 46 joins the lever arm braces 40 to the fork arms 18 which are mounted inwardly with respect to the lever arm braces with rotational movement of the lever arm braces causing a corresponding rotational movement of the fork arms. This arrangement permits the fork arms 18 to be located more closely together than lifting arms 12 which are desirably mounted a distance apart that is slightly greater than the width of the refuse storage body 10. The fork arms 18 are desirably located more closely together since their distance apart is determined by the width of the refuse container 24 and the location of the fork slots 26 positioned on the sides thereof.

After upward rotational movement of the lifting arms to the dotted line position indicated as 12', the fork arms are rotated with respect to the lifting arms to assume a substantially horizontal position indicated in dotted line drawing as 18' in alignment with fork slots 26. At this point, the wheeled vehicle 4 may be moved slightly forward in the direction of the arrow B which brings the fork arms in position 18' into engagement with the fork slots 26.

Figure 3:
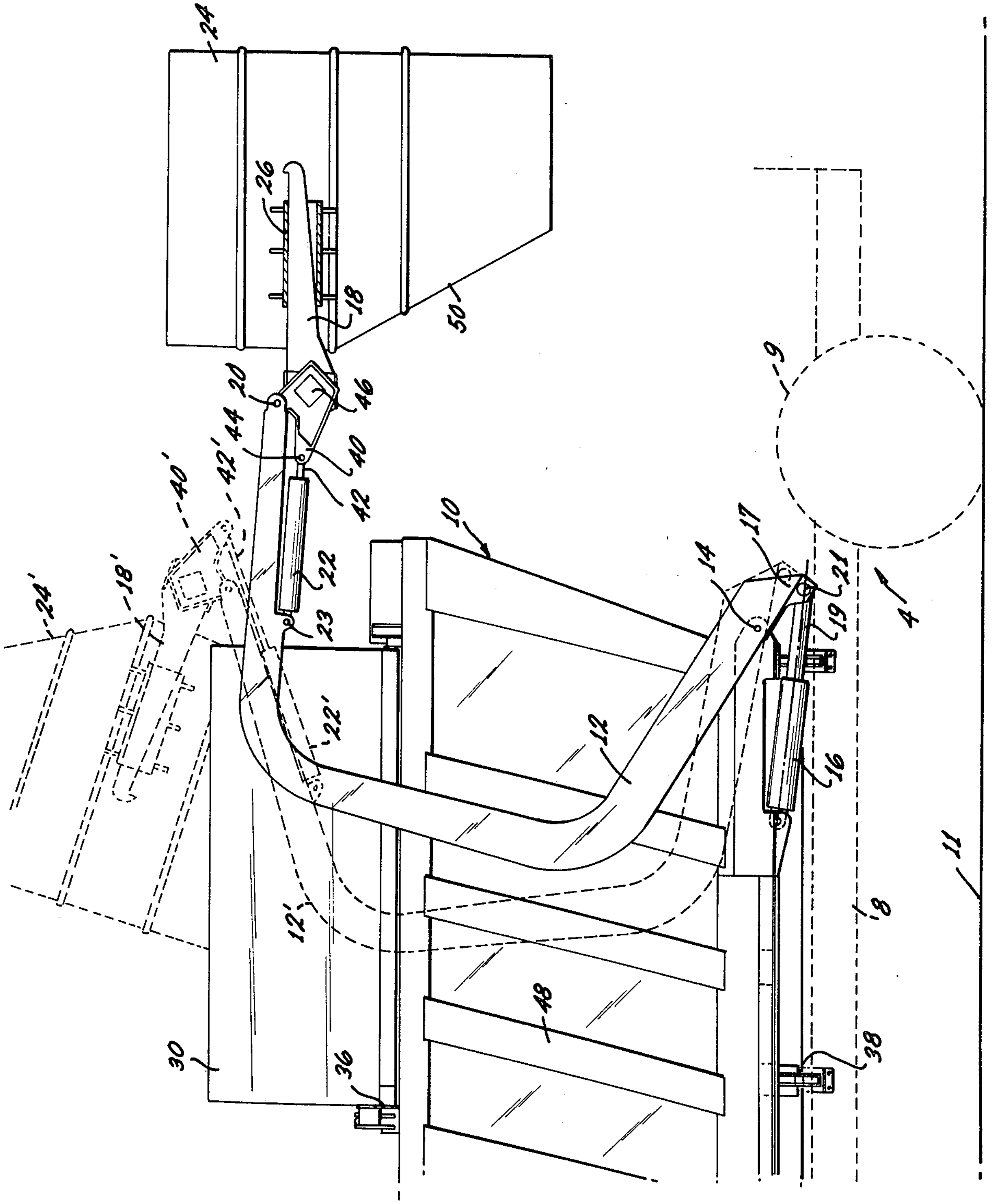
FIG. 3 is a side elevational view, similar to FIG. 2, illustrating the continued upward movement of the lifting arms and fork arms to raise a refuse container in a substantially level position to a point above the vehicle cab with the refuse container then being inverted to dump its contents through an opening in the top of the refuse storage body.

After engagement of the fork arms 18 with fork slots 26, the continued upward rotational movement of lifting arms 12 raises the refuse container to a position above the ground as shown in FIG. 3 which is a partial side elevational view similar to FIG. 2. During raising of the refuse container 24, the fork arms 18 are rotated in a clockwise direction with the speed of rotation of the fork arms controlled in response to the speed of upward rotation of lifting arms 12. This maintains the refuse container 24 in a substantially horizontal position as it is lifted above the vehicle cab 6 (see FIG. 1), which serves to prevent slippage of the loaded refuse container off of the fork arms 18. In maintaining the container 24 in a substantially horizontal position as it is lifted, the hydraulic cylinders 22, which control the position of the fork arms 18, are contracted in timed relation to the extension of hydraulic cylinders 16 which control the movement of lifting arms 12.

As indicated, the refuse storage body 10 may include side braces 48 which are preferably angled upwardly in a forward direction to provide strength to the refuse storage body. The refuse container 24 preferably includes a sloping back surface 50. By reason of the sloping back surface 50, the refuse container 24 does not have to be swung in as wide an arc in clearing the vehicle cab 6 (see FIG. 1) as it is lifted.

After raising the refuse container 24 to the approximate position shown in solid line drawing in FIG. 3, the refuse container is then inverted to dump its contents through a top opening into the refuse storage body 10. The lifting arms 12 may also be rotated further to the position indicated in dotted line drawing as 12'. During the inversion of container 24, the hydraulic cylinders 22 are extended to rotate the fork arms 18 in a counterclockwise direction with respect to lifting arms 12. The position of the fork arm cylinders after their extension is shown in dotted line drawing as 22' and the position of the fork arms after their rotation is shown in dotted line drawing as 18'. The refuse container in its inverted position is indicated as 24' with the doors 30 in an opened position to act as wind screens on either side of the refuse container.

After dumping the contents of refuse container 24 into storage body 10, the sequence of events depicted in FIGS. 2 and 3 is generally reversed. The container 24 is then returned to its upright position 24 as shown in FIG. 3 and the lifting arms 12 are lowered to their solid line position shown in FIG. 2. However, since the refuse container 24 is now empty, it may not be necessary to rotate the fork arms in unison with rotation of the lifting arms 12 during lowering of the container. For example, the fork arms 18 may be positioned so that they are angled slightly upwardly from their position shown in solid line drawing in FIG. 3 to insure that the container 24 remains firmly supported by the fork arms during lowering of the empty container.

When the refuse container 24 has been lowered to ground level, the fork arms 18 may be removed from the fork slots 26 by backing the wheeled vehicle 4 away from the refuse container in a direction opposite to that of the arrow B shown in FIG. 2. During downward rotational movement of the lifting arms 12 from their position shown in dotted line drawing as 12' in FIG. 3, the doors 30 are closed to close the upper opening in refuse storage body 10. During closing of the doors 30, the doors are actuated with a positive closing force with the doors, thereby, serving to exert a downward packing force on any refuse within the storage body 10 which is contacted by the doors.

After removal of the fork arms 18 from the fork slots 26, the lifting, dumping, and lowering cycle for the front end loader is completed with the cycle being repeated each time the contents of a refuse container are dumped into the refuse storage body 10. After completion of the cycle, the fork arms 18 may be rotated to their solid line position shown in FIG. 2 for movement of the wheeled vehicle 4 to a new location. Also, as indicated previously, the lifting arms 12 may be rotated to a raised position as a safety measure to place the fork arms 18 out of the way during movement of the wheeled vehicle 4 over the road.

Figure 4:
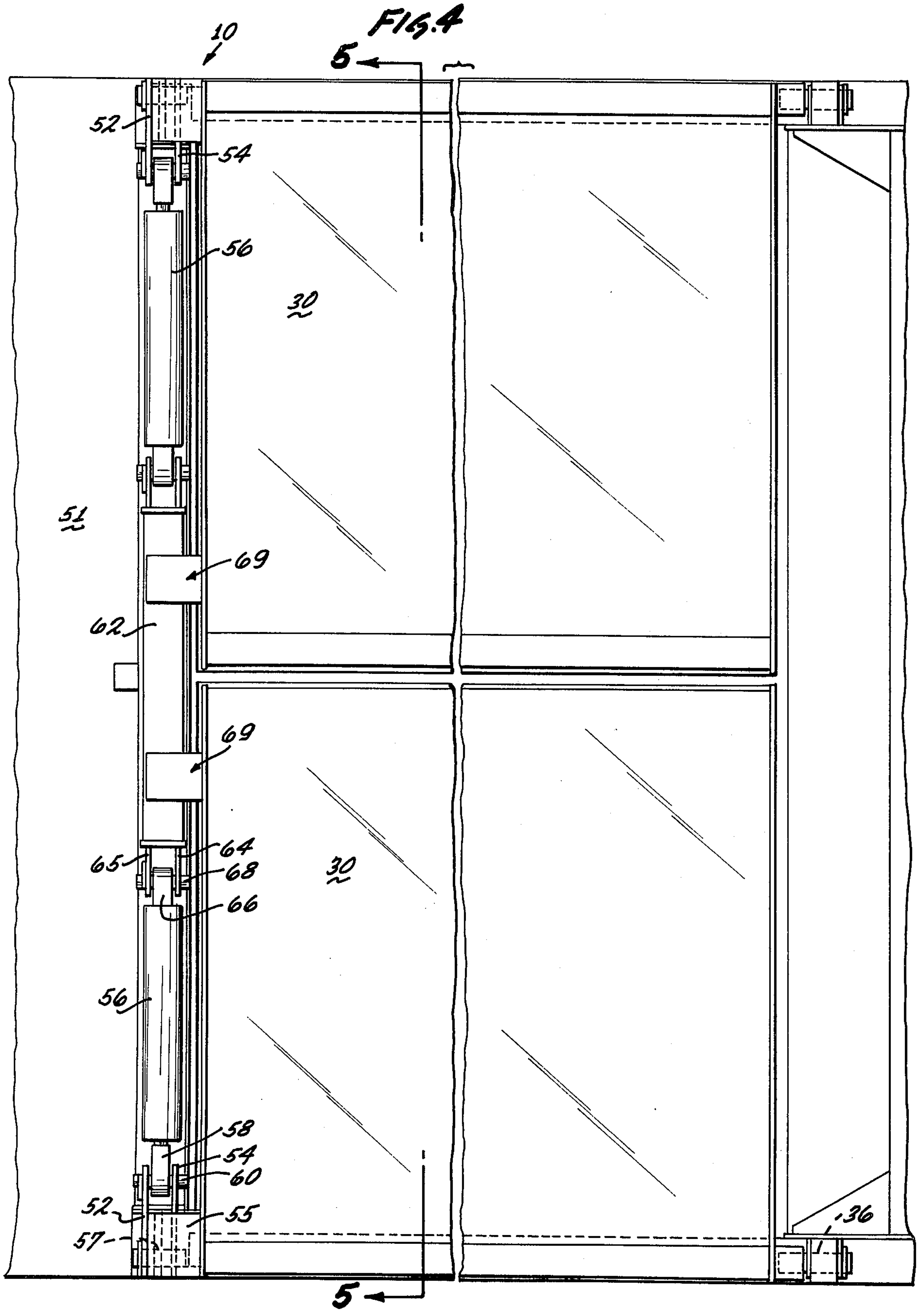
FIG. 4 is a top view of the refuse storage body taken along lines 4—4 of FIG. 2 and illustrating doors positioned to close a top opening into the refuse storage body with hydraulic cylinders mounted on the top of the refuse storage body for movement of the doors between an open and a closed position.

FIG. 4, which is a partial top view of the refuse storage body 10 taken along lines 4—4 of FIG. 2, illustrates the doors 30 in a closed position to cover a top opening into the refuse storage body. The refuse storage body 10 includes a top surface 51 on which pairs of pivot braces 52 and 54 are pivotally mounted with each pair of pivot braces being connected to a door 30 through a door brace 55. Each pivot brace 52, as illustrated, is positioned a spaced distance away from the corresponding pivot brace 54 with the pivot braces being rotatably secured to top surface 51 through a pivotal connection 57. A pair of hydraulic cylinders 56 with piston rods 58 are each connected through a pin 60 to a pair of pivot braces 52 and 54 with the pin passing through aligned apertures in the pivot braces. The inner end of each hydraulic cylinder 56 is pivotally connected to a piston support beam 62 mounted on top surface 51 of the refuse storage body 10. The piston support beam 62 includes spaced-apart support member 64 and 65 positioned at either of its ends with the support members secured in any suitable manner to the support beam. A support eye 66 formed on the inner end of each of the hydraulic cylinders 56 is engaged by a pin 68 which also passes through aligned apertures in support members 64 and 65.

As described, the doors 30 are actuated by extension or contraction of the hydraulic cylinders 56. To move the doors 30 from their closed position shown in FIG. 4 to an open position, the hydraulic cylinders 56 are each extended which causes outward movement of the piston rod 58 and rotational movement of the pivot braces 52 and 54 about pivotal connection 57. The rotational movement of the pivot braces 52 and 54 is transmitted to the door 30 through the door brace 55 with each door 30 thereby undergoing upward rotational movement to an open position.

During closing of the doors 30, each hydraulic cylinder 56 is contracted. This causes each pair of pivot braces 52 and 54 to rotate inwardly toward the piston support beam 62 with the inward rotation transmitted through door brace 65 to cause a corresponding inward rotation of door 30. Stop members 69 are secured to each of the doors 30 with the stop members shaped to lie on top of the piston support beam 62 to support the doors in their closed position.

Figure 5:
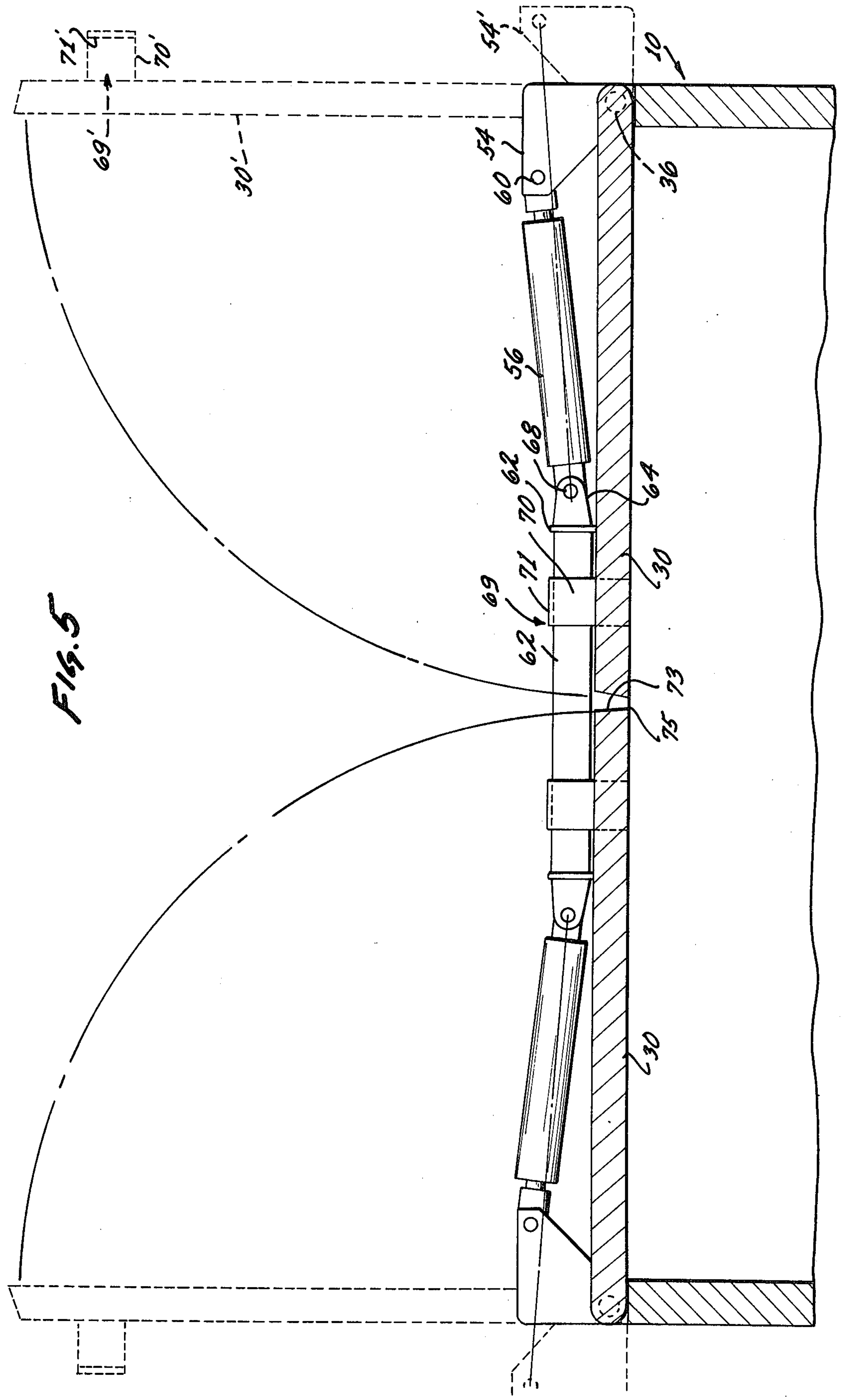
FIG. 5 is a partial elevational view taken along lines 5—5 of FIG. 4 which shows the raising of the doors to an open position through extension of hydraulic cylinders which are connected to the doors.

FIG. 5, which is a sectional view taken along lines 5—5 of FIG. 4, illustrates rotational movement of the doors in going from a solid line closed position 30 to a dotted line open position 30'. As indicated, extension of the hydraulic cylinders 56 causes outward pivotal movement of each pair of spaced apart pivot braces 52 and 54 which is imparted to the doors 30. One of the pivot braces 54 is shown in solid line drawing in its position with the door 30 closed. On extension of hydraulic cylinder 56, the pivot brace 54, together with a companion pivot brace 52, is rotated to a dotted line position 54' with this rotation being transmitted to the door 30 to move it to its open position 30'.

With the door in its open position 30', the stops 69, which are L-shaped, include a front member 70 which projects outwardly from the open door 30' and a side member 71 which projects rearwardly. In usage, the front members 70 of the stops 69 serve to engage the lifting arms 12 in their raised position with the doors in their open position 30'. When the doors 30 are in their position shown in solid line drawing, the side members 71 of stops 69 then engage the upper support surface of piston support beam 62 in providing support for the doors 30. As illustrated, an angled closure surface 73 is provided on each door 30. The angled surfaces 73 each form sharp corners 75 at their intersection with the inner surface of the door 30 with the sharp corners functioning as knife edges to shear refuse which may extend between the doors as they are closed.

Figure 6:
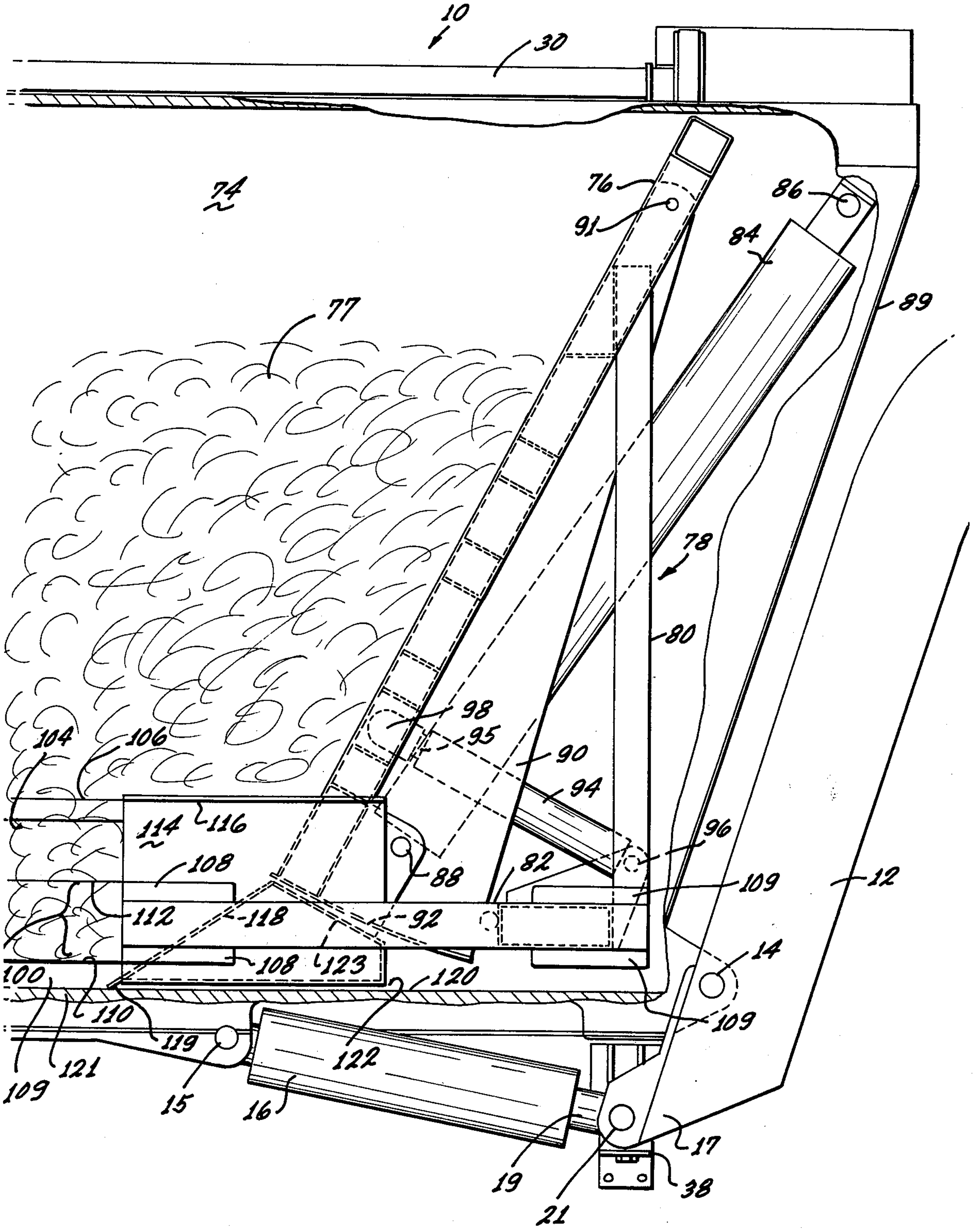
FIG. 6 is a partial side sectional view through the refuse storage body with a compaction panel positioned forwardly of the top opening into the refuse storage body with the compaction panel being movable in a rearward direction through extension of a telescopic cylinder to compact refuse which is introduced into the storage body.

FIG. 6, which is a partial side sectional view through storage body 10 and the doors 30, illustrates a storage body interior 74 which contains refuse 77 that has been dumped into the interior through opening of the doors 30. Within the interior 74, the refuse 77 is contacted by a compaction panel 76 which is shown in its forward position within the refuse storage body 10. The compaction panel 76 is mounted on a support frame, indicated generally as 78, which includes generally vertical members 80 and generally horizontal members 82 which may be tied together in any suitable manner through bracing, etc. The compaction panel 76 may be moved to its forward position shown in FIG. 6 by contraction of a telescopic cylinder 84 or be moved rearwardly through extension of the telescopic cylinder.

In usage, the compaction panel 76 is positioned as shown in FIG. 6 when refuse is dumped into the storage body 10. The compaction panel 76 is then moved in a rearward direction within the storage body 10 to compact the refuse 77 against the interior of the tailgate 32 (see FIG. 1) that is secured to the storage body. In this manner, refuse 77 within the storage body 10 is highly compacted such that the storage body will contain a greater quantity of refuse. By compacting the refuse 77 to a higher degree than previous front end loaders, the front end loader of the invention contains a greater weight of refuse per unit volume than previous front end loaders. Thus, the present front end loader does not have to be emptied as frequently. Thus, it is able to operate more efficiently with less time being required for discharge of the refuse at a dumping point which may be a land fill or a transfer station where refuse is transferred to a hauling vehicle for movement to a more distant land fill or refuse dump.

As illustrated, the telescopic cylinder 84 may be positioned at an angle with the refuse storage body 10 with the telescopic cylinder connected to the storage body through an upper pivot 86 and connected to the compaction panel 76 and support frame 78 through a lower pivot 88. Due to the inclination of compaction panel 76 within the storage body 10, the front extremity of the storage body is preferably angled and terminates at an angled support member 89. The angle of the front portion of storage body 10, thus, accommodates the angled telescopic cylinder 84 in its contracted position while permitting horizontal member 82 to move as far forwardly as possible within the refuse storage body.

As illustrated, the angle of the compaction panel 76 provides an upward component of movement to refuse 77 that is contacted by the compaction panel. This upward component of movement or upwardly directed packing force is of considerable importance in the functioning of the front end loader since it provides a more uniform density throughout the load of refuse. Due to the force of gravity, the refuse at the bottom of the load has a tendency to be more dense than the refuse at the top of the load. The force of gravity, therefore, works to provide the load of refuse with a density which is non-uniform. It is desirable in any kind of refuse compaction equipment to obtain a compaction density throughout the refuse that is as near uniform as is possible. This permits packing a larger quantity of refuse into a storage body of a given size with the result that the compaction operation is made more efficient. The storage body will then contain more refuse and will not have to be emptied as frequently. This is of particular importance in refuse compaction equipment, such as a front end loader, which is mounted on a vehicle chassis and is moved from place to place in collecting refuse.

When a front end loader functions to compact refuse to a greater density and also a more uniform density, the efficiency of the front end loader is greatly increased. The front end loader will then contain a greater quantity of refuse and be able to make more pick-up stops and collect more refuse before losing operational time in making a trip to a dump or a refuse transfer point.

To further increase the density of refuse 77 within the storage body 10, there is included a stuffer panel or panels 90 which may be pivotally secured to the compaction panel 76 through pivotal supports 91. As illustrated, the compacting surface of the stuffer panel 90 which contacts the refuse 77 may be coextensive with the compacting surface of the compaction panel 76 which contacts the refuse 77 with the stuffer panel in its position shown in FIG. 6. The stuffer panel 90, as shown, may have a pie-shaped configuration and an arcuate lower surface 92 which is positioned closely adjacent to a corresponding arcuate surface formed in the compaction panel 76. A stuffer cylinder 94 may be pivotally secured to support frame 78 through a pivotal connection 96 while a piston rod 95 for the stuffer cylinder is pivotally secured to the stuffer panel 90 through a pivotal connection 98. On extension of the stuffer cylinder 94, as will be described, the stuffer panel 90 may then undergo rotational movement about the pivotal support 91. The compacting surface of the stuffer panel 90 then moves inwardly and away from the compacting surface of the compaction panel 76 to exert a secondary packing force on refuse 77 which has already been compacted through contact with the compaction panel.

After dumping refuse 77 within the storage body interior 74, as shown in FIG. 6, the compaction panel 76 is moved in a rearward direction within the storage body 10 through extension of the telescopic cylinder 84. During rearward movement of the compaction panel 76, the compaction panel is supported with respect to the storage body 10 by guide slots 100 formed in either side of the storage body. The guide slots 100 each include a bottom ledge 102 which projects inwardly into the storage body interior 74 from the sidewall of the storage body 10 and a top ledge 104 which likewise projects inwardly. The top ledge 104 may include an inclined portion 106 which projects inwardly but is inclined with regard to the sidewall.

The horizontal members 82, which form a portion of the support frame 78, each project outwardly into one of the guide slots 100 with slide shoes 108 positioned on the upper and lower surfaces of the horizontal member making contact with slide surfaces 110 and 112 of the guide slot 100. The slide shoes 108, as illustrated, are positioned adjacent one end of the horizontal members 82 while slide shoes 109 are positioned on the top and bottom surface of the horizontal members adjacent their other end. The contact of slide shoes 108 with slide surfaces 110 and 112 and the contact of slide shoes 109 with the slide surfaces maintains the horizontal members 82 in a desired horizontal position to prevent tilting of the support frame 78 during movement of the compaction panel 76 through expansion or contraction of telescopic cylinder 84.

To lessen interference of the refuse 77 with sliding movement of the support frame 78, guard plates 114 are positioned on either side of the compaction panel 76 in overlying relation to the guide slots 100. As is more clearly shown in FIG. 9, the guard plates 114 each include a transverse member 116 which extends in the direction of the sidewall of the refuse storage body 10 with the transverse member shielding the top ledge 104 and inclined surface portion 106 from refuse. The face of the compaction panel 76, thus, has a width which extends essentially to the sidewalls of the refuse storage body 10 in the region above the transverse members 116 of the guard plates 114. However, the compaction panel 76 has a width which terminates at the guard plates 114 in the region of the guard plates.

An angled scraper plate shown in phantom line drawing as 118, is joined to the face of the compaction panel 76 at its lower edge with the scraper plate having a lesser angle of inclination to a bottom surface 120 of the refuse storage body 10 than the compaction panel. The scraper plate 118 is joined at its outer edges to guard plates 114 with the scraper plate including a bottom edge 119 positioned in close proximity to the bottom surface 120. In its function, the scraper plate 118, by reason of its greater angle of inclination to the bottom surface 120, imparts an upward direction of movement to refuse 77 that is contacted by the scraper plate. This has the tendency of moving the refuse upwardly into contact with the compacting face of the compaction panel 76 and the compacting face of the stuffer panel 90 where the refuse is subjected to a greater packing force than can be applied by the angled scraper plate 118. During upward movement of refuse 77 through contact with the angled scraper plate 118, the guide slots 100 are shielded from the refuse by the guard plates 114.

As described, the compaction panel 76 and support frame 78 are supported away from the bottom surface 120 of refuse storage body 10 through contact of the slide shoes 108 and 109 with slide surfaces 112 and 114. Thus, there is preferably no contact between the support frame 78 and the bottom surface 120 which is indicated by the gap 122 between the supporting structure 123 for the scraper plate 118 and the bottom surface 120 of a bottom wall 121 of refuse storage body 10.

Figure 7:
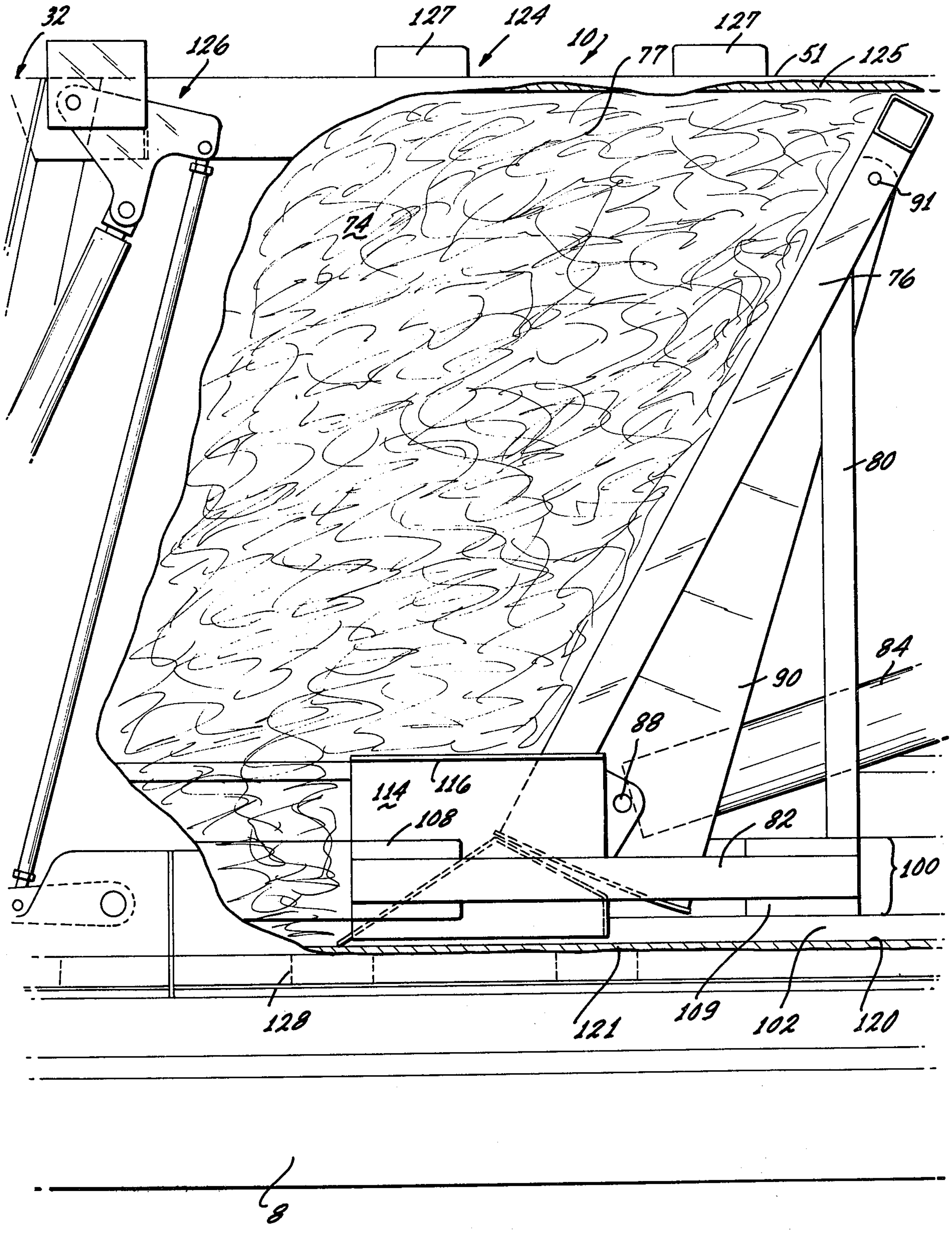
FIG. 7 is a partial side sectional view of the refuse storage body showing the compaction panel positioned adjacent the rear of the storage body after extension of the telescopic cylinder.

As described, after the dumping of refuse within the storage body interior 74 by opening of doors 30, as shown in FIG. 6, the compaction panel 76 is moved in a rearward direction through extension of the telescopic cylinder 84. The position of the compaction panel 76, after undergoing rearward movement, is illustrated in FIG. 7 which is a partial side sectional view of the refuse storage body 10 taken adjacent to its connection to the tailgate 32. On rearward movement of the compaction panel 76 to its position shown in FIG. 7, the upward component of packing force applied by the angled surface of the compaction panel has a tendency to pack the refuse upwardly against the roof structure 124 of the refuse storage body 10.

As indicated, the roof structure 124 may include an upper wall 125 with cross braces 127 which provide the roof structure with increased strength to resist the upward packing forces and the storage body 10 may be supported on chassis 8 by support braces 128 shown in phantom line drawing. The upwardly directed packing forces imparted to refuse 74 by the angled compaction plate 76 tend to offset the effect of gravity which tends to provide greater refuse densities in the bottom portions of a refuse load. Thus, the refuse 74 has a more uniform compaction density and a greater quantity of refuse can be packed within storage body 10. During the compaction of refuse 74, the tailgate 32 is in a closed, locked position relative to storage body 10 through operation of a tailgate latching mechanism referred to generally as 126.

Figure 8:
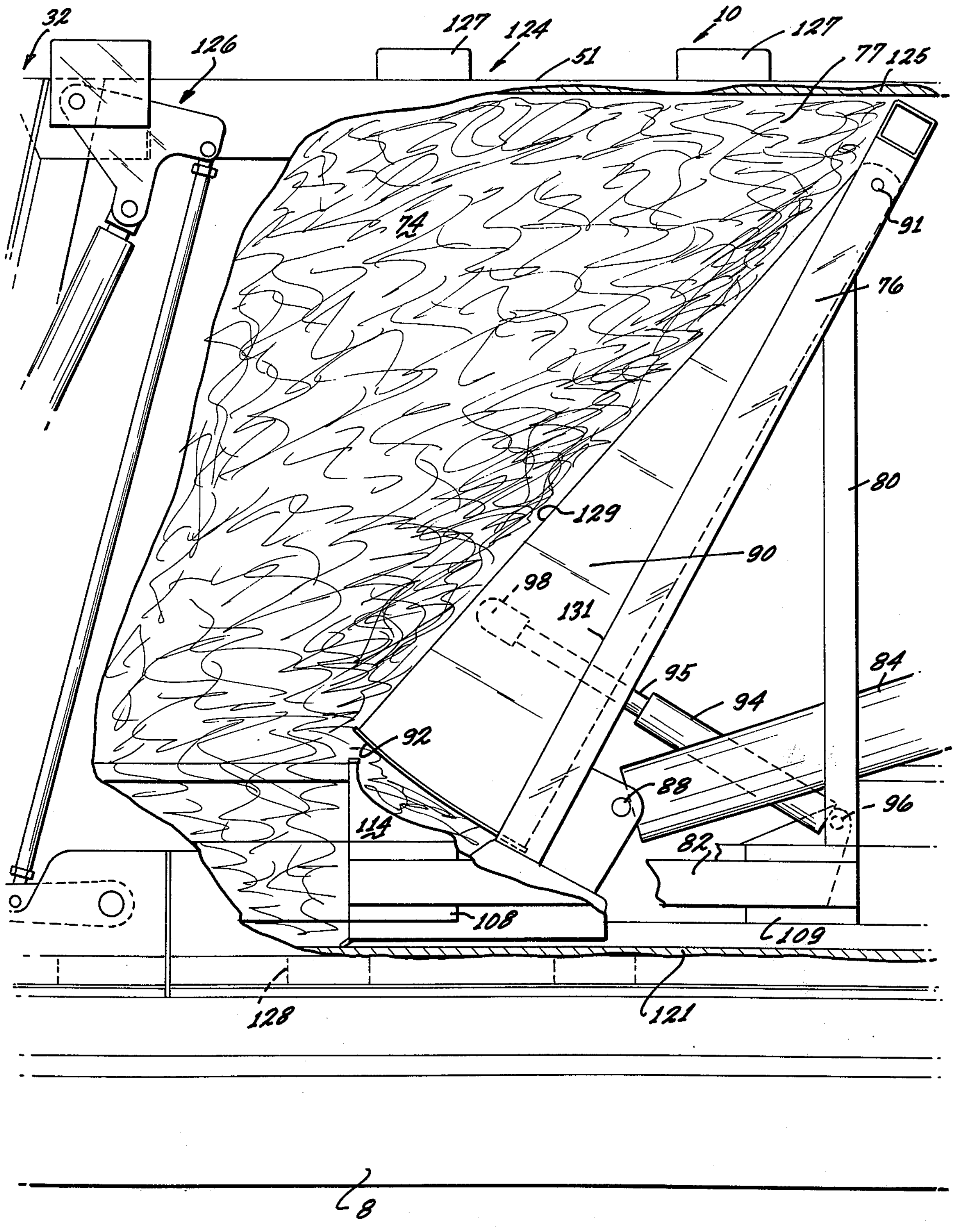
FIG. 8 is a partial side sectional view, similar to FIG. 7, showing the actuation of stuffer panels pivotally secured to the compaction panel to give the refuse an upwardly directed secondary pack by actuation of the stuffer panels while the compaction panel is held in a relatively fixed position.

After compaction of refuse 74 to a predetermined extent through rearward movement of the compaction panel 76, as indicated in FIG. 7, the refuse is then given a secondary pack by actuation of the stuffer panels 90 as illustrated in FIG. 8, which is a side sectional view of the refuse storage body similar to FIG. 7. During actuation of the stuffer panels 90, the stuffer panels are pivoted about their pivotal connections 91 to the compaction panel 76. The pivotal movement of stuffer panels 90 results from extension of the stuffer cylinders 94 as shown in FIG. 6. With the stuffer cylinders 94 fully extended, the stuffer panels 90 are pivoted to their position shown in FIG. 8 with a compacting surface 129 of each stuffer panel being forced into the body of refuse 77. This forms a cavity within refuse corresponding to the volume of refuse displaced through rearward and upward rotation of the stuffer panel 90.

The position of the compacting surface 129 of stuffer panel 90 relative to the compacting surface 131 of compaction panel 76 indicates the degree of rotational movement of the stuffer panel with respect to the compaction panel since compacting surfaces 129 and 131 are essentially coextensive when the stuffer panel is in its retracted position.

As indicated in FIG. 8, the angle of the compacting surface 129 of stuffer panel 90 changes during rotational movement of the stuffer panel with respect to the compaction panel 76. During rearward and upward rotational movement of the stuffer panel 90, the angle of compacting surface 129 with respect to the refuse storage body 10 is decreased. This decrease in the angle of compacting surface 129 imparts an even greater upward component of packing force to the refuse 77. Further, because of the pie-shaped configuration of stuffer panel 90, coupled with its upper pivotal connection 91 to compaction panel 76, the linear movement of the surface 129 away from surface 131 increases in direct proportion to the distance between a particular point on compacting surface 129 and the pivotal connection 91.

The upward packing force applied to refuse 77 by movement of the stuffer panel 90 is, thus, greatest in the lower regions of storage body interior 74 and decreases gradually from one pint to another along packing surface 129 in approaching the pivotal connection 91. This is advantageous since there is a greater upward packing force applied to refuse 77 in the lower regions of the refuse container 10 where there is a greater tendency for refuse to be more dense due to the force of gravity.

The compacting surfaces 129 of stuffer panels 90 have an area which is considerably less than the area of the compacting surface 131 for the compaction panel 76. As illustrated, the surfaces 129 may actually be coextensive with surface 131 with the stuffer panels 90 in retracted position. Since the compacting surfaces 129 have a lesser area than the area of the compacting surface 131, the packing force per unit area applied by the surfaces 129 may be much greater than the force per unit area applied by the surface 131 - assuming the pressure of hydraulic fluid used to actuate stuffer panels 90 is the same as the pressure used to actuate compaction panel 76.

Thus, as will be described, compaction panel 76 is moved rearwardly within storage body 10 until the pressure of hydraulic fluid within telescopic cylinder 84 reaches a predetermined level with hydraulic fluid then being fed to the stuffer cylinders 94 (see FIG. 6) to supply a greater force per unit area to the refuse 77 through actuation of the stuffer panels 90. Preferably, the movement of compaction panel 76 and the movement of stuffer panels 90 is coordinated with the compaction panel undergoing rearward movement followed by movement of the stuffer panels to form cavities within the refuse 77, followed by further movement of the compaction panel, etc. When the compaction panel 76 is moved rearwardly until the pressure of hydraulic fluid within telescopic cylinder 84 reaches a predetermined level, the entire compacting surface 131 of the compaction panel is in contact with the refuse 77. Then, after actuation of stuffer panels 90, preferably with successive extensions and contractions of stuffer cylinders 94, cavities or voids are formed within the refuse which have a volume equal to the volume of refuse displaced by the stuffer panels.

The voids or cavities formed within the refuse 77 through actuation of stuffer panels 90 reduce the area on the compaction surface 131 which is contacted by refuse 77. Thus, with stuffer panels 90 in a retracted position and their compacting surfaces 129 being substantially coextensive with compacting surface 131, the compaction panel 76 may then be again actuated in a rearward direction through further extension of telescopic cylinder 84. When the pressure of hydraulic fluid within telescopic cylinder 84 then again reaches a predetermined level, the stuffer panels 90 may again be actuated to form voids within the body of refuse 77 with the compaction panel then being again actuated, etc.

By, thus, compacting the refuse 77 in a sequential manner through alternate movement of the compaction panel 76 and the stuffer panels 90, a much greater packing density may be obtained in the refuse 77. As will be described, whenever desired, the compaction operation may be terminated by moving the compaction panel 76 in a forward direction through contraction of telescopic cylinder 84 such that the compaction panel is positioned at the forward end of refuse storage body 10.

Preferably, the sequential packing movement of the compaction panel 76 and the stuffer panels 90 occurs automatically through a hydraulic control system, as will be described. When actuated in this manner, the sequential movement of the compaction panel 76 and the stuffer panels 90 may occur, for example, when the front end loader is being operated over the road to a new location for pickup of refuse. In this regard, the present packing mechanism represents a vase improvement over conventional packing mechanisms for front end loaders. In previous packing mechanisms, a compaction panel was merely moved rearwardly to compact refuse and was then moved forwardly to pick up additional refuse. Such a packing mechanism did not lend itself to packing over the road since packing was essentially completed once the rearward movement of the compaction panel had been completed.

Figure 9:
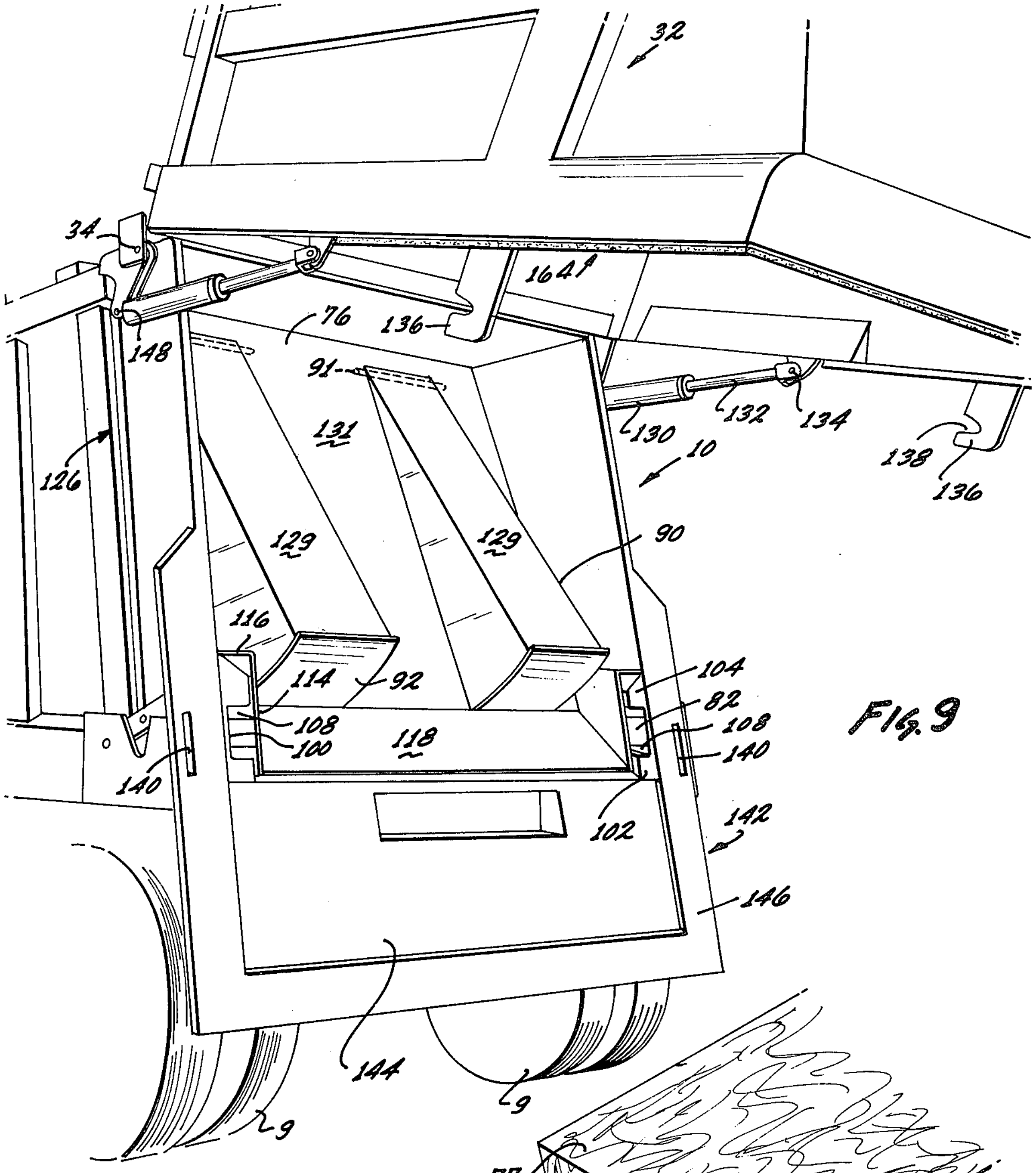
FIG. 9 is a pictorial view of the rear end of the front end loader as it appears during ejection of refuse from the storage body with the tailgate in a raised position and the ejection panel moved to its rearward position.

FIG. 9, which is a pictorial view of the rear of the refuse storage body 10 with the tailgate 32 in a raised position, illustrates the appearance of the compaction panel 76 with the stuffer panels 90 fully extended and pivoted outwardly and upwardly relative to the compaction panel. As indicated, the guard plates 114 shield the guide slots 100 and tend to prevent interference by refuse with the sliding movement of the horizontal members 82 within the guide slots. Further, the guard plates 114 are connected to the angled scraper plate 118 at its extremities such that refuse which is moved upwardly within the refuse storage body 10 by contact with the scraper plate is not moved into contact with the guide slots 100.

In movement of the tailgate 32 to an open position, tailgate cylinders 130 are extended to extend piston rods 132 which are connected to the tailgate through pivotal connections 134. Latch members 136 secured to either side of the tailgate 32 each include a keeper groove 138. With the tailgate 32 in its lowered position relative to refuse storage body 10, the latch members 136 each extend into a latch slot 140 in the refuse storage body and the tailgate is locked with respect to the refuse storage body by the tailgate latching mechanism 126 in a manner which will be described. With tailgate 32 in its locked position with respect to the refuse storage body 10, a bearing member, generally indicated as 142, is in contact with the tailgate 32. The bearing member 142 includes a recessed portion 144 which is bounded by a bearing surface 146 that contacts the tailgate 32. The inner ends of the tailgate cylinders 130 are connected to the refuse storage body 10 through pivotal connections 148. On extension of cylinders 130, the tailgate 32 is pivoted to its raised position shown in FIG. 9 and compacted refuse may then be discharged from the refuse storage body 10 through rearward movement of the compaction panel 76. Also, as will be described, the extension of the cylinders 130 unlocks the tailgate latching mechanism 126 such that the tailgate 32 is first unlocked from the refuse storage body 10 and is then pivoted to an open position.

Figure 10:
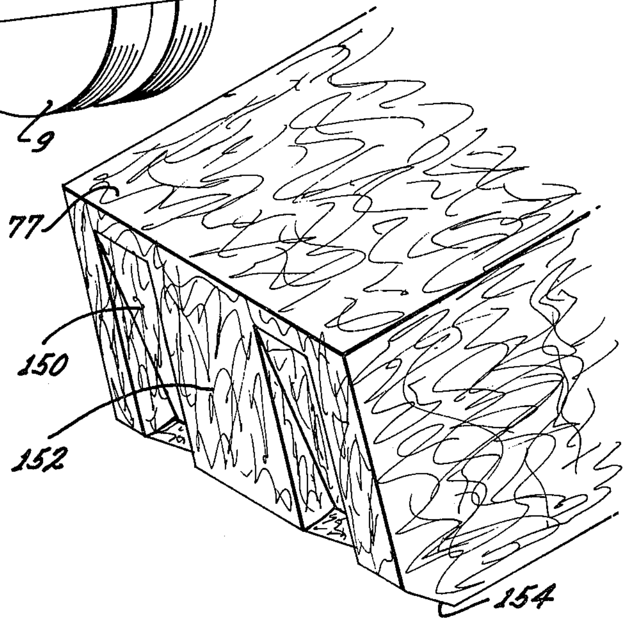
FIG. 10 is a pictorial representation illustrating the appearance of compacted refuse within the storage body with cavities formed in the refuse through actuation of the stuffer panels and a flat portion formed between the depressions through contact of the refuse with the compaction panel surface.

FIG. 10 illustrates in pictorial view the appearance of the body of refuse 77 in compacted form within the refuse storage body 10. As shown, a pair of cavities 150 are formed within the refuse 77 through extension of the stuffer panels 90 with the cavities 150 being separated by a raised connecting portion 152 that is in contact with the compaction surface 131. The sloped bottom surface 154 on the body of refuse 77 is formed through contact of the refuse with the angled scraper blade 118.

As illustrated, the cavities 150 formed in the body or refuse 77 decrease the area of the refuse which contacts the compaction surface 131 of compaction panel 76. Thus, when stuffer panels 90 are retracted with their compaction surfaces 129 being essentially coextensive with compaction surface 131, there is no or very little refuse in contact with the surface 131 at the regions bounded by the cavities 150. Thus, the reaction force exerted by refuse against compaction panel 76 is reduced while the force per unit area exerted by the compaction panel against the refuse is increased in proportion to the reduction in the contact area of the refuse caused by cavities 150. This, then, promotes further compaction of the body of refuse 77 through continued rearward movement of the compaction panel 76.

Figure 11:
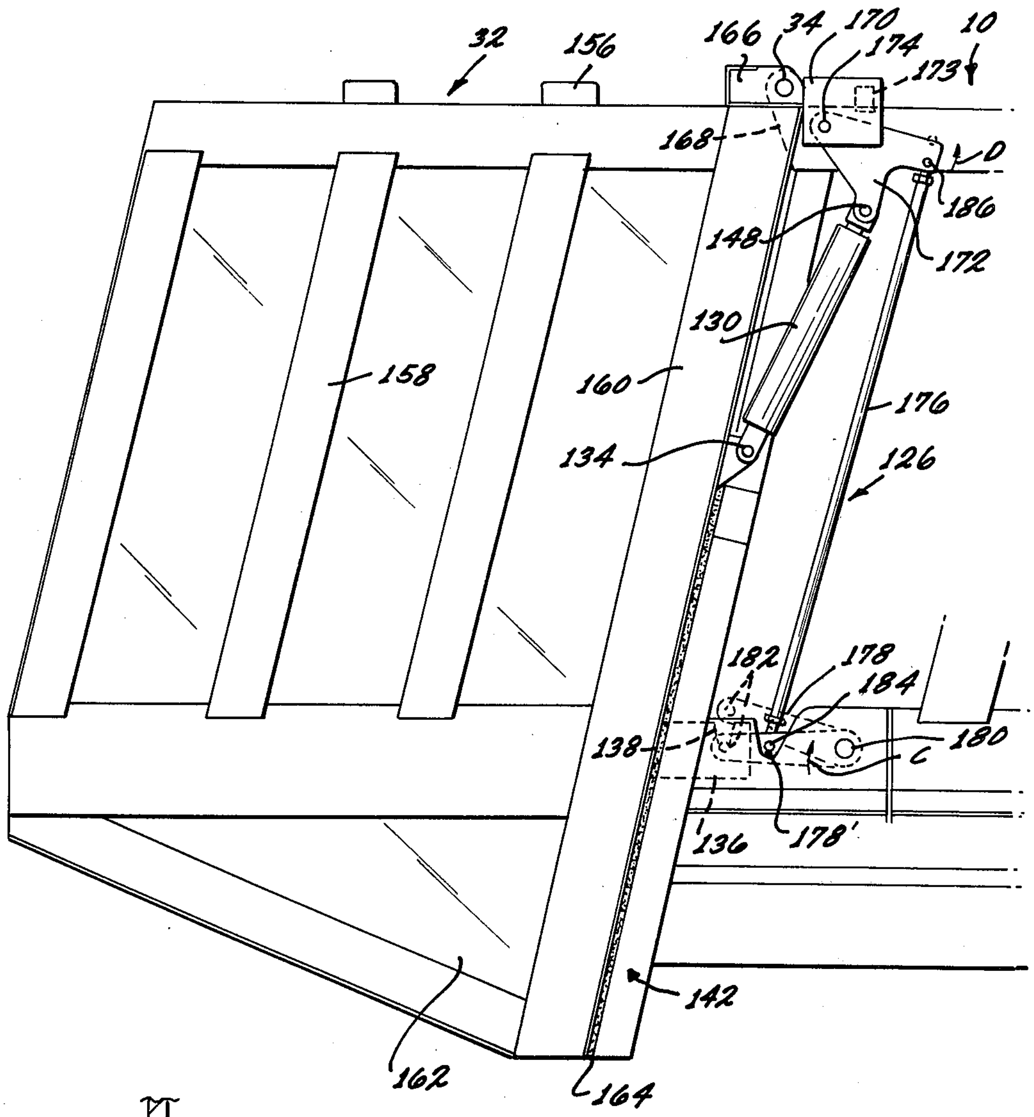
FIG. 11 is a partial side elevational view of the tailgate of the front end loader in a closed position and illustrating movement of the latch mechanism through which the tailgate is locked to the refuse storage body.

FIG. 11 is a partial side sectional view illustrating the tailgate 32 and its connection to the refuse storage body 10. As indicated, top brace members 156 may be employed to strengthen the top or roof portion of the tailgate 32 while side brace members 158 are used to strengthen the sides of the tailgate. In the compaction of refuse within refuse storage body 10, the compacted refuse extends into the tailgate 32. Thus, the tailgate 32 is subjected to large forces resulting from compaction of the refuse within the refuse storage body 10.

The tailgate 32 includes a pair of end braces 160 positioned along the inner extremities of the tailgate adjacent its connection to the refuse storage body 10. As illustrated, the end braces 160 may each extend downwardly a distance below the refuse storage body 10 to form, together with the structural members of the tailgate 32, a liquid well 162. During the compaction of refuse within refuse storage body 10 and tailgate 32, the compaction forces will produce liquifaction of liquid-containing materials within the refuse, such as fruit, vegetables, etc. The liquid, which is thus formed by the compaction forces, will have a tendency to flow to the low point within either the tailgate 32 or refuse storage body 10 - this being the liquid well 162. Since the liquid well 162 is positioned below the level of the refuse storage body 10, this region is not subjected to large compaction forces and, thus, is best suited for the storage of liquid. To prevent leakage of liquid from the liquid well 162, a seal member 164 is positioned between the members on the tailgate 32, such as the end braces 160, and the members on the refuse storage body, such as the bearing member 142, which are in contacting relation when the tailgate is closed.

As described previously, the tailgate 32 is pivotally mounted with respect to the storage body 10 through pivotal connections 34. The pivotal connections 34 may be formed between pivot plates 166 fixedly positioned on the tailgate 32 and pivot plates indicated in phantom line drawing as 168 which are fixedly connected to the refuse storage body 10. The pivotal connections 34 may, thus, be formed between the pivot plates 166 and 168 in rotatably securing the tailgate 32 to the refuse storage body 10.

Turning to a discussion of the tailgate latching mechanism generally indicated as 126, a lever plate 170 is fixedly connected to the refuse storage body 10 in any suitable manner and a lever member 172 is rotatably connected to the lever plate through a pivotal connection 174. A stop member 173 secured to the lever plate 170 is positioned above the lever member 172 so as to limit the extent of its rotational movement.

A locking rod 176 extends downwardly from the outer end of lever member 172 and is pivotally connected to the lever member through a pivotal connection 186. The lower end of locking rod 176 is pivotally connected to a lock lever 178 which is pivotally secured to the refuse storage body 10 through a pivotal connection 180. The lock lever 178 includes a keeper pin 182 at its outer end which engages the keeper groove 138 in the latch member 136 as described in regard to FIG. 9. The lower end of the locking rod 176 is pivotally connected to the lock lever 178 through a pivotal connection 184.

A tailgate latching mechanism 126, as described above, may be positioned on either side of the refuse storage body 10 with the two tailgate latching mechanisms working in unison during locking or unlocking of the tailgate 32 through engagement or disengagement of keeper pin 182 with the keeper slot 138 in latch member 136.

During initial extension of hydraulic cylinders 130 mounted on either side of the tailgate 32, the initial extension of the cylinders exerts a force on lever member 172 which causes it to rotate in the direction of the arrow D until the upper surface of the lever member engages the stop member 173. Rotation of the lever member 172 in the direction of the arrow D exerts an upwardly directed force on the locking rod 176 which causes rotation of the lock lever 178 in the direction of the arrow C. Rotation of the lock lever 178 in the direction of arrow C causes the keeper pin 182 to be withdrawn from the keeper groove 138 such that the tailgate 32 is then unlocked from the refuse storage body 10. During continued extension of the hydraulic cylinders 130, after unlocking of the tailgate latching mechanism 126, the tailgate 32 is rotated upwardly and outwardly with respect to the refuse storage body 10 about the pivotal connections 34.

Figure 12:
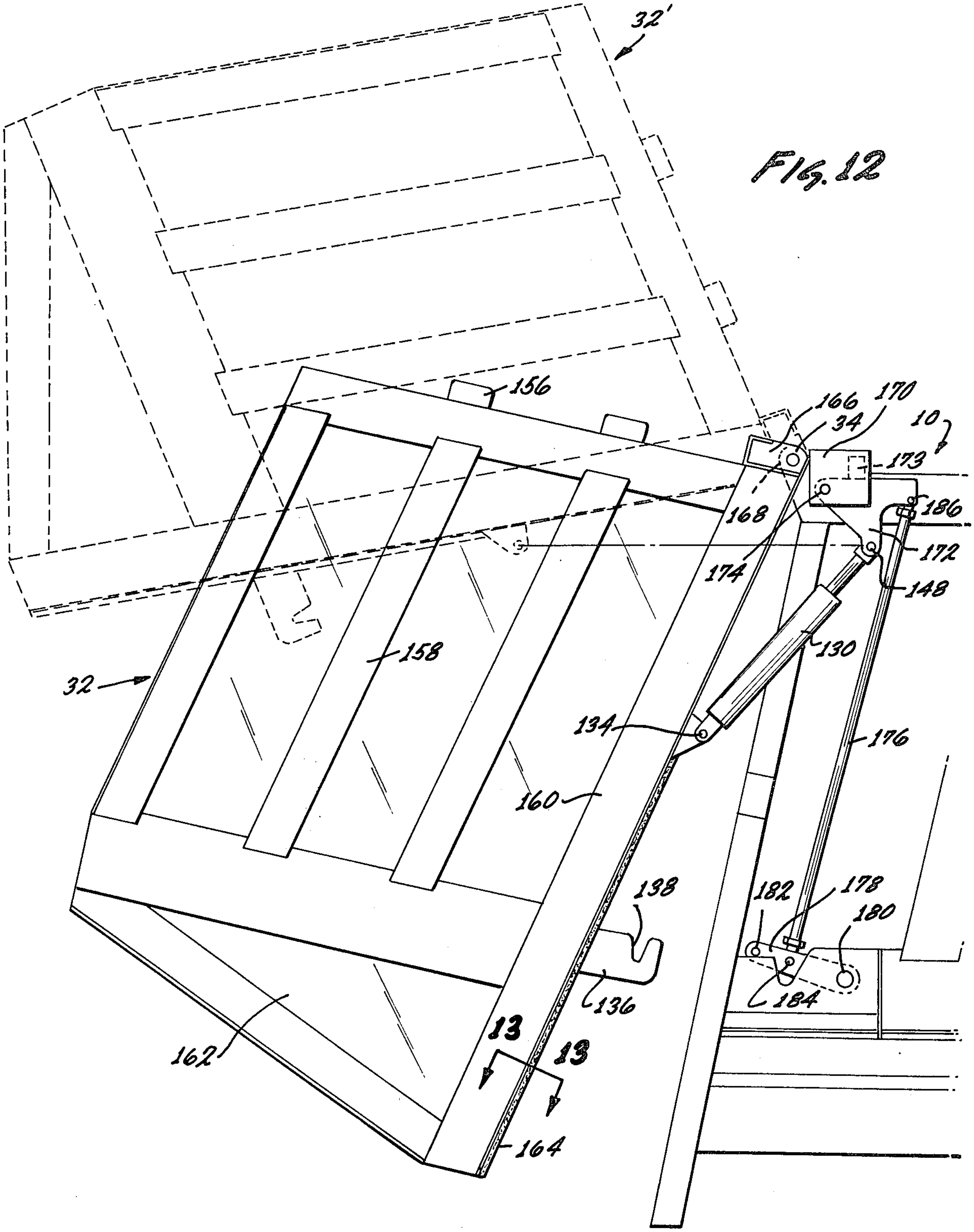
FIG. 12 is a partial side elevational view, similar to FIG. 11, illustrating the position of the tailgate as it is pivoted upwardly with respect to the refuse storage body and with the latching mechanism for the tailgate being unlocked through extension of the hydraulic cylinders used to raise the tailgate.

Turning to FIG. 12, the continued extension of hydraulic cylinders 130 causes the tailgate 32 to pivot upwardly and outwardly away from contact with the refuse storage body 10. The tailgate 32 is shown in solid line drawing after being pivoted through a relatively small arc to move the tailgate away from the refuse storage body with continued extension of the hydraulic cylinders 130 causing the tailgate to continue its upward rotation to a raised position indicated in phantom line drawing as 32'. During pivoting of the tailgate 32 away from refuse storage body 10, any liquid in the liquid well 162 is dumped. At the same time, because the inner surface of the liquid well 162 is slanted downwardly, clearance is provided to permit rotation of the tailgate 32 past refuse contained within the tailgate without imposing an undue strain on the hydraulic cylinders 130, etc.

Figure 13:
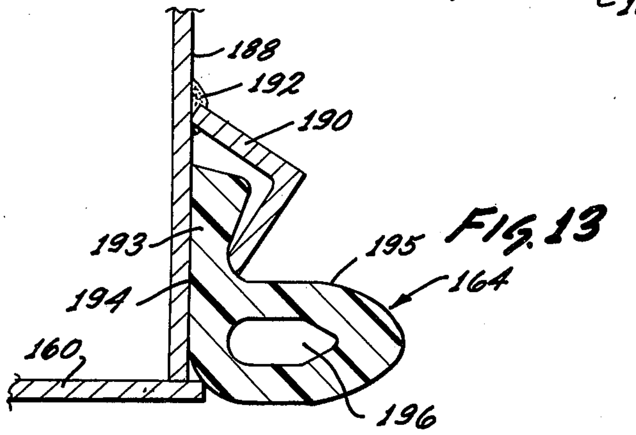
FIG. 13 is a sectional view taken along lines 13—13 of FIG. 12 showing the configuration of a seal that is positioned between the tailgate and the refuse storage body to seal a liquid well in the tailgate against leakage when the tailgate is in its lowered, locked position.

FIG. 13 is a detail view illustrating the configuration of the seal member 164 which is positioned between the contacting surfaces of the tailgate 32 and the refuse storage body 10 with the seal 164 extending around the liquid well 162 and terminating at points positioned above the floor surface of the refuse storage body 10. As indicated, a contact surface member 188 may be positioned transversely of the end braces 160 and be joined thereto in any suitable manner. An L-shaped seal retainer member 190 may then be secured to the contact surface member 188 through any convenient means such as a weld 192. The L-shaped seal retainer member 190 extends over a base portion 193 of the seal member 164 to firmly engage a flattened surface 194 of the seal member 164 with the contact surface member 188. The seal member 164 may include an outwardly extending, somewhat ovalshaped protuberance 195 which is compressed when the tailgate 32 is in a closed position to form a seal between the tailgate and the refuse storage body 10 and to prevent leakage from the liquid well 162. If desired, the protuberance 195 may include a cavity 196 to assist in deformation of the protuberance in forming a seal between the tailgate 32 and refuse storage body 10.

It should be emphasized that various forms of seals may be used in forming a liquid-tight seal between the tailgate 32 and the refuse storage body 10 when the tailgate 32 is in a closed position to prevent leakage from the liquid well 162. Thus, it is not essential that the seal between the tailgate 32 and the refuse storage body use the particular seal member 164 illustrated in FIG. 13. However, the configuration of the seal member 164 has been found to be well suited in performing this particular function.

Figure 14:
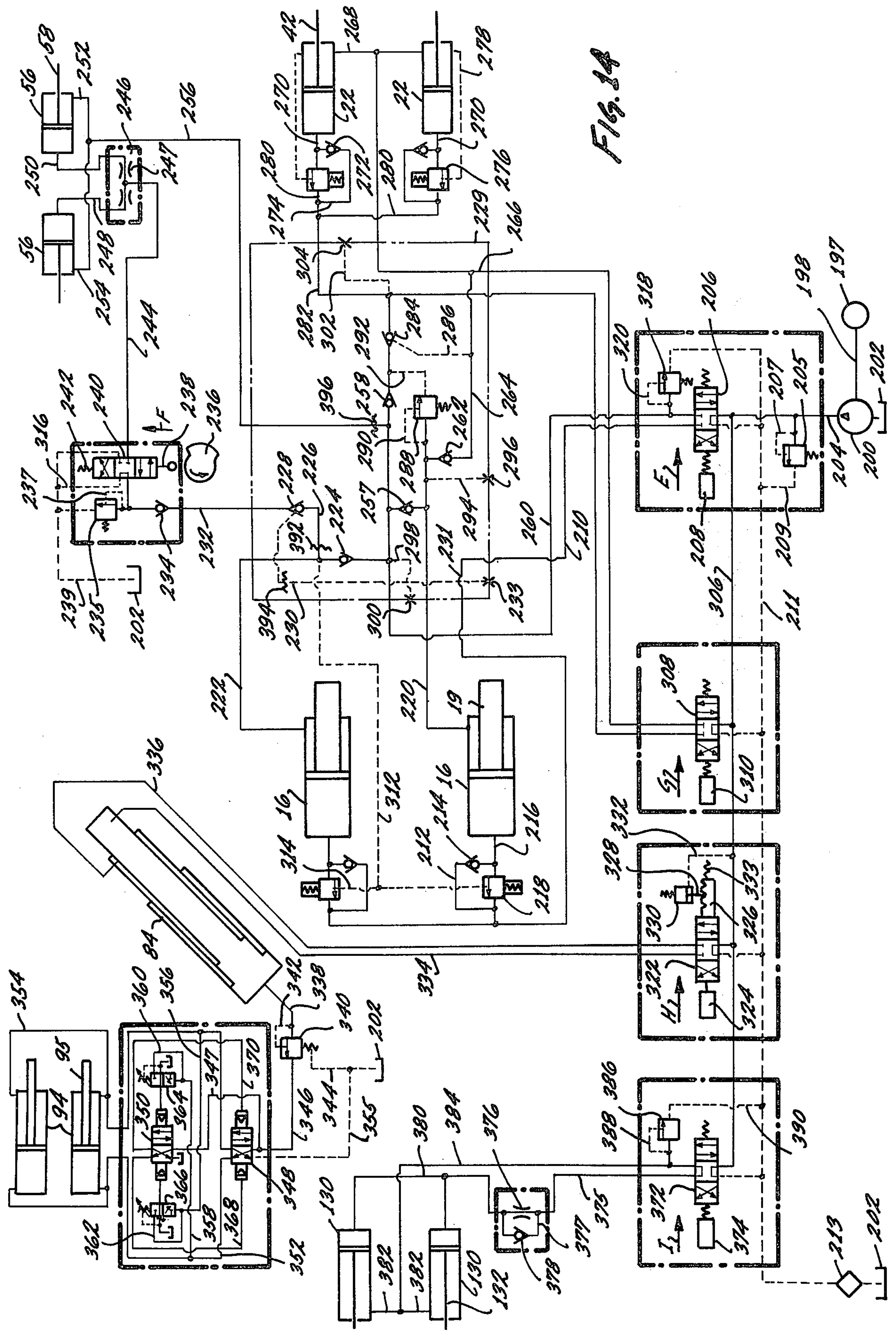
FIG. 14 is a detailed schematic drawing showing the hydraulic circuitry for the front end loader.

FIG. 14 illustrates in schematic view the hydraulic circuitry used for operation of the front end loader as described in FIGS. 1–13 of the drawings.

In providing power for operation of the various mechanisms on the front end loader, a motor 197 is connected through a drive 198 to a pump 200 with the pump receiving hydraulic fluid from a sump 202 and discharging hydraulic fluid through a line 204. A pilot operated relief valve 205 is connected to line 204 and is controlled through a pilot line 207. If the pressure in the line 204 exceeds a predetermined value, the pilot valve 205 is automatically opened which permits the fluid in line 204 to be discharged through valve 205 to a line 209 which leads to a sump line 211 where the fluid passes through a strainer 213 and returns to the sump 202. A sump is indicated in a number of locations through FIG. 14 for purposes of convenience. However, it should be understood that a common sump is preferably employed. Thus, the designations of a sump in the various locations have all been numbered with reference numeral 202.

The opening of pilot operated valve 205 when the pressure in line 204 exceeds a predetermined value provides a safety check on the entire hydraulic system for the front end loader. A failure in any part of the system would be reflected by a build-up in pressure in line 204 which is common to every part of the system.

The line 204 leads to a valve 206 which may be shifted in the direction of the arrow E through movement of a manual shift lever 208. Assuming the valve 206 to have been shifted in the direction of arrow E, hydraulic fluid from line 204 passes through valve 206 to a line 210 which leads to the head ends of hydraulic cylinders 16 used for raising and lowering of the lifting arms 12. The line 210 branches at a point adjacent the head ends of cylinders 16 with the oil in each branch passing through a bypass line 212 and a check valve 214 to enter the cylinders through a line 216. In passing through the bypass line 212 and the check valve 214, the hydraulic fluid bypasses a counterbalance valve 218 whose function will be described subsequently.

The passage of hydraulic fluid into the head ends of hydraulic cylinders 16 causes the cylinders to extend with hydraulic fluid at the rod ends of the cylinders being withdrawn through lines 220 and 222. The hydraulic fluid which is withdrawn through line 222 performs a different function than the fluid withdrawn through line 220 and the flow of fluid in these lines will, therefore, be described separately.

The hydraulic fluid withdrawn through line 222 is restrained from flow by a check valve 224 such that the fluid is diverted to a line 226. The fluid in line 226 passes through a pilot operated check valve 228 which is opened by the pressure transmitted through a pilot line 230 that is connected to line 210 at connection 231. The line 210, as previously described, contains high presssure fluid which is being fed to the head ends of cylinders 16. The pilot line 230 also leads to a gauge 233 which may be positioned on the outside of an enclosure 229 indicated in broken line drawing as surrounding certain of the hydraulic components in the system.

After passage of the hydraulic fluid through the open pilot operated check valve 228, the fluid passes into a line 232 and through a check valve 234. The hydraulic fluid passing through check valve 234 leads to a pilot operated valve 235 which is controlled through a pilot line 237. When the pressure of the hydraulic fluid exceeds a predetermined value, the pilot operated valve 235 is automatically opened to permit hydraulic fluid to pass through the valve to a sump line 239 where the fluid is returned to sump 202.

A rotatable cam 236 is connected in any suitable manner to lifting arms 12 with the position of the cam being directly related to the rotational position of the lifting arms 12 as described in FIGS. 2 and 3. When the lifting arms 12 are rotated upwardly to a predetermined position, the surface of the cam 236 encounters a cam follower 238 that is moved upwardly through contact with the cam surface to shift a valve 240 against the pressure of a spring 242 in the direction of the arrow F. Assuming the valve 240 has been shifted in the direction of arrow F, hydraulic fluid may then pass through valve 240 to a line 244 leading to hydraulic cylinders 56 which control the movement of the doors 30 as described previously. The hydraulic fluid in line 244 is fed to a divider-combiner valve 246 which includes flow constrictors 247 that limit the speed with which the hydraulic fluid flows to lines 248 and 250. The divider-combiner valve 246, thus, functions to split the flow of hydraulic fluid to cylinders 56 so the flow is evenly divided and also prevent the hydraulic cylinders 56 from extending too rapidly so as to cause damage to doors 30.

The lines 248 and 250 lead to the head ends of hydraulic cylinders 56 to cause the cylinders to extend in opening the doors 30. During extension of hydraulic cylinders 56, hydraulic fluid at the rod ends of the cylinders is withdrawn through lines 252 and 254 which each lead to a line 256. Line 256 leads to a line 260 and is restrained in its flow by a check valve 258 and also by a check valve 257 which is closed by the pressure of fluid on the other side of valve 257 with the line 260, thus, returning the fluid through the valve 206 to the sump line 211.

As described, the hydraulic fluid withdrawn through line 222 from the rod end of one of the hydraulic cylinders 16 is utilized for extension of the cylinders 56 in opening the doors 30 positioned at the top of the refuse storage body 10. When the hydraulic cylinders 56 bottom out in opening of the doors 30, there is a build-up in pressure in line 244 which is transmitted through open valve 240 to the pilot line 237. This causes the pilot operated valve 235 to open to permit fluid to pass through valve 235 to sump line 239.

Turning now to a discussion of the hydraulic fluid withdrawn from the rod end of the other hydraulic cylinder 16 through line 220, this fluid is restrained in its flow by a check valve 257. The pressure of the fluid in line 220 also serves to keep the check valve 257 closed and to prevent flow of fluid from line 260 through the check valve 257 as described previously. The fluid in line 220 then passes through a check valve 262 to a line 264 which joins a line 266 leading to the rod ends of the cylinders 22 used to control the positioning of the fork arms 18 as described in regard to FIGS. 2 and 3 of the drawings. The line 266 branches to form branch lines 268 which lead to the rod ends of the cylinders 22.

As hydraulic fluid enters the rod ends of the cylinders 22 through the branch lines 268, the cylinders 22 contract with hydraulic fluid at the head ends of the cylinders being withdrawn through lines 270. The fluid in lines 270 is restrained from flow through bypass lines 274 by check valves 272 but is permitted to flow through pilot operated valves 276. The valves 276 are controlled by the pressure in pilot lines 278 which sense the pressure of fluid at the rod ends of cylinders 22. The pilot valves 276 are set to maintain a pressure at the head ends of cylinders 22 which is sufficient to maintain the piston rods 42 in an extended position in supporting a load applied to the fork arms 18 by the loaded refuse container 24 (see FIG. 3). Thus, even if there were a failure in the hydraulic system, the fork arms 18 would not lower to drop the loaded container 24.

The pistons in cylinders 22 have a greater area that is contacted by hydraulic fluid at their head ends than at their rod ends. Thus, a higher pressure is required at the rod ends of cylinders 22 to generate a force on the pistons which exceeds the force generated by fluid at the head ends which is sufficient to hold the load on the fork arms 18 in the event of a hydraulic failure. When the pressure of fluid at the rod ends of cylinders 22 builds up to a predetermined value, the pressure is transmitted through pilot lines 278 and causes the valves 276 to open which permits fluid at the head ends of the cylinders to pass through the valves to lines 280 which join to form a line 282.

The volume of the cylinders 22 at their rod ends is sized in relation to the volume of the cylinder 16 at its rod end. Thus, the volume of fluid discharged from the rod end of cylinder 16 through line 220 during extension of the cylinder is the correct amount of fluid to provide contraction of cylinder 22 at a rate which maintains the fork arms 18 substantially horizontal as the lifting arms 12 are being raised.

The hydraulic fluid in line 282 which is received from the head ends of cylinders 22 flows through a pilot operated check valve 284 which is controlled by the pressure in a pilot line 286 that is connected to line 264. As described previously, hydraulic fluid in line 264 is under pressure and is being fed to the rod ends of cylinders 22. The pressure of the hydraulic fluid in line 264 is, thus, transmitted through pilot line 286 to move the check valve 284 to an open position and to permit the flow of hydraulic fluid from line 282 through valve 284. The hydraulic fluid, after passing through pilot operated valve 284, is then conveyed to line 260 which returns the fluid through valve 208 to the sump line 211.

As a safety feature, a pilot operated valve 288 may be positioned in line 220 which conveys hydraulic fluid to the rod ends of the fork cylinders 22. In the event that there is an obstruction which would prevent rotational movement of the fork arms 18 and contraction of the fork cylinders 22, a build-up of pressure may occur in line 220 which is transmitted through a pilot line 290 to the pilot operated valve 288. When the pressure in the pilot line 290 reaches a predetermined value, the pilot valve 288 is shifted to an open position and hydraulic fluid in line 220 is permitted to pass through the pilot valve 288 to a line 292 leading to the line 260. The hydraulic fluid is then conveyed through line 260 and valve 206 to the sump line 211.

As described, the pilot operated valve 288, thus, operates as a safety valve to permit discharge of hydraulic fluid from line 220 to the sump 202 when there is an obstruction which prevents contraction of the fork cylinders 22. A gauge line 294 leads from line 220 to a gauge 296 which may be positioned on the exterior of the enclosure 229 and a gauge line 298 leads from line 260 to a gauge 300 positioned on the exterior of the enclosure. Also, a gauge line 302 leads from line 282 to a gauge 304 positioned on the exterior of enclosure 229. Through use of the gauges 296, 300, and 304, the operator may check the pressures in lines 282, 220, and 260 to determine whether the system is functioning satisfactorily.

As described, with valve 206 shifted in the direction of arrow E through movement of the manual shift lever 208, the hydraulic cylinders 16 are extended to cause upward rotation of the lifting arms 12. During the extension of hydraulic cylinders 16, the hydraulic fluid withdrawn from the rod end of one of the cylinders 16 through line 220 is employed for contraction of the fork cylinders 22. The contraction of the fork cylinders 22 occurs in a slow and controlled manner by reason of the pilot operated valves 276 which control the flow of hydraulic fluid from the head ends of the cylinders. Thus, contraction of the fork cylinders 22 is coordinated with the extension of the lifting cylinders 16 with the net result being that the fork arms 18 are maintained in a relatively horizontal position during the upward rotational movement of the lifting arms 12. Through maintaining of the fork arms 18 in a relatively horizontal position during upward rotation of the lifting arms 12, the loaded refuse container 24, as described in regard to FIGS. 2 and 3, is maintained in a relatively level position.

Also, during the extension of cylinders 16, hydraulic fluid withdrawn from the rod end of the other of the cylinders 16 through line 222 is used for extension of hydraulic cylinders 56 to open the doors 30 on the top of refuse storage body 10. The extension of cylinders 56 in timed relation to the upward rotational movement of the lifting arms 12 is controlled through rotatable cam 236 whose rotational movement is synchronized with rotational movement of lifting arms 12 with the cam controlling movement of a valve 240. The valve 240 controls the flow of fluid to cylinders 56 with extension of the cylinders 56 being, thereby, keyed to movement of the lifting arms 12.

With the valve 206 shifted in the direction of the arrow E, as described, the lifting arms 12 are rotated from their lowered position shown in solid line drawing in FIG. 2 to their raised position shown in phantom line drawing as 12' in FIG. 3. At the same time, the doors 30 have been moved to an open position through extension of the hydraulic cylinders 56 and the loaded refuse container 24 has been maintained in a relatively horizontal position through contraction of hydraulic cylinders 22 at a controlled rate with respect to expansion of the hydraulic cylinders 16. After rotational movement of the lifting arms to their phantom line position 12' in FIG. 3, to valve 206 is returned to its neutral position shown in FIG. 14 which fixes the position of lifting arms 12 and the position of cylinders 56 such that the doors 30 remain open.

To then rotate the fork arms to their phantom line position 18' in FIG. 3 and to invert the loaded refuse container to its position 24', hydraulic fluid is fed from line 204 through a line 306 to a valve 308 which is shifted in the direction of the arrow G by a manual shift lever 310. On shifting of the valve 308 in the direction of the arrow G, hydraulic fluid passes through valve 308 from line 306 to line 282 and through bypass lines 274 and check valves 272 to lines 270 leading to the head ends of cylinders 22. The cylinders 22 are, thereby, extended which causes rotational movement of fork arms in a counterclockwise direction from their solid line position 18 to their phantom line position 18' in FIG. 3. This moves the refuse container to its inverted position 24'.

As hydraulic fluid is fed to the head ends of cylinders 22, hydraulic fluid is withdrawn from the rod ends of the cylinders through the branch lines 268 and conveyed through line 266 through valve 308 and to the sump line 211.

After inversion of the refuse container 24 through shifting of valve 308 in the direction of arrow G, the valve 308 is shifted in a direction opposite to arrow G. Hydraulic fluid from line 306 then passes through valve 308 into line 266 where it is conveyed through branch lines 268 to the rod ends of cylinders 22. As described previously, the flow of hydraulic fluid from the head ends of cylinders 22 is restrained by the check valves 272 and the closed pilot operated valves 276. However, when the pressure of hydraulic fluid at the rod ends of cylinders 22 has built up to a predetermined level, the pilot operated valves 276 are opened by the transmission of pressure to the valves through pilot lines 278. This, then, permits the escape of hydraulic fluid from the head ends of cylinders 22 through the open pilot operated valves 276 to lines 280, line 282, valve 308, and sump line 211.

After dumping refuse from container 24 by shifting valve 308 first in the direction of arrow G and then in a direction opposite to arrow G, the lifting arms 12 are lowered by shifting valve 206 in a direction which is opposite to arrow E. With valve 206 shifted to its new position, hydraulic fluid in line 204 flows through valve 206 into line 260. A portion of the hydraulic fluid in line 260 passes through check valve 224 to line 222 and is conveyed to the rod end of one of the hydraulic cylinders 16. The remainder of the fluid in the line 260 passes through the check valve 257 into line 220 and is conveyed to the rod end of the other of the hydraulic cylinders 16.

With hydraulic fluid being fed through lines 220 and 222 to the rod ends of cylinders 16, there is a tendency for the cylinders 16 to undergo contraction, as required for lowering of the lifting arms 12. Contraction of the cylinders 16 is, however, opposed by the check valves 214 and closed pilot operated valves 218 which restrain the flow of fluid from the head ends of cylinders 16. The pilot operated valves 218 are, however, controlled by pilot lines 312 and 314 which transmit pressure to the valves from line 22. After a build-up of pressure in line 222, the pressure is transmitted through pilot lines 312 and 314 which causes valves 218 to shift to an open position with the hydraulic fluid at the head ends of cylinders 16 then being discharged through valves 218 to line 210 which returns the fluid through valve 206 to the sump line 211.

As the hydraulic cylinders 16 are contracted, and the lifting arms 12 are rotated downwardly, the cam 236 is rotated in a direction counter to its rotational direction during upward rotational movement of the lifting arms 12. This causes the cam follower 238 and valve 240 to move in a direction opposite to the arrow F.

A portion of the pressurized hydraulic fluid being fed into line 260 flows through lines 256, 252 and 254 to the rod ends of cylinders 56 which causes the cylinders 56 to contract and to rotate the doors 30 to their closed position. During contraction of cylinders 56, hydraulic fluid at the head ends of the cylinders is withdrawn through lines 248 and 250, divider-combiner 246, line 244, downwardly-shifted valve 240 and into a line 316 to sump line 239. The withdrawn fluid also passes through flow constrictors 247 which reduces the contraction rate of cylinders 56 to prevent damage to the doors 30 by being closed too rapidly.

The pressurized hydraulic fluid being fed to the rod ends of cylinders 56 during closing of the doors 30 imposes a positive downward force on the doors 30 as they are being closed. This positive downward force permits the doors 30 to perform a packing function, as described in regard to FIG. 5, during their downward rotational movement.

With valve 206 shifted in a direction opposite to arrow E, hydraulic fluid fed to line 260 will attempt to flow through check valves 257 and 262 and lines 264, 266 and 268 to the rod ends of cylinders 22. However, with the refuse container 24 now being empty, the pressure of hydraulic fluid in line 260, as required for contraction of cylinders 16 and cylinders 56, is not sufficient to open the pilot operated valves 276. Thus, valves 276 remain closed during downward rotational movement of the lifting arms 12 and the cylinders 22, therefore, remain in a stationary position. As described previously, the fork arms 18 may be inclined upwardly prior to lowering of the lifting arms 12. The upward inclination of the fork arms 12 may be controlled by the operator by controlling the extent of the contraction of cylinders 22 in reinverting the container 24 to its solid line position of FIG. 3 with valve 206 in its neutral position and valve 308 shifted in a direction opposite to arrow G.

A pilot valve 318 is connected to the line 260 with the valve being controlled through a pilot line 320. When the pressure in line 260 exceeds a predetermined level, pressure transmitted through the pilot line 320 causes the valve 318 to shift to an open position. This, then, permits hydraulic fluid to flow from the line 260 through the valve 318 to the sump line 211. The valve 318, thus, acts as a safety valve in relieving pressure in the line 260 if there is an obstruction which, for example, prevents the downward rotational movement of the lifting arms 12.

After dumping refuse into the refuse storage body 10 through the open doors 30, the ejection panel 76 is in its forward position, as shown in FIG. 6, and the telescopic cylinder 84 is contracted. To begin the packing of the refuse within refuse storage body 10, a valve 322 is shifted in the direction of the arrow H through operation of a manual shift lever 324. The valve 322 is held in its shifted position through retention of a spring biased detent pin 328 within one of a plurality of notches in a stop plate 326.

A detent release piston 330 is connected to the detent pin 328 with the position of the piston controlled by the pressure in a pilot line 332 which is connected to line 306. The detent release piston 330 serves as a safety device in releasing the valve 322 for return to its rest position under the influence of a biasing spring 333 if the pressure in the line 306 exceeds a predetermined level. Thus, if there should be some mechanical failure which causes a rapid build-up in pressure within the hydraulic system controlling the packing mechanism, this would be reflected in a build-up in pressure in line 306 which permits the valve 322 to return to its rest position with no further flow of hydraulic fluid to the packing mechanism.

With valve 322 in its shifted position in the direction of the arrow H, hydraulic fluid flows through valve 322 to a line 334 to telescopic cylinder 84 which causes the cylinder to extend. On expansion of telescopic cylinder 84, the ejection panel 76 is moved rearwardly within the refuse storage body 10 to a position, for example, as shown in FIG. 7. During extension of the telescopic cylinder 84, hydraulic fluid retained within the cylinder in its contracted position is exhausted through a line 336 leading to valve 322 where the hydraulic fluid is exhausted to sump line 211.

After extension of telescopic cylinder 84, the pressure within the cylinder begins to build up when the resistance to compaction of the refuse is such that the ejection panel 76 can undergo no further movement against the refuse. The build-up in pressure within telescopic cylinder 84 is transmitted through a line 338 with flow through line 338 being obstructed by a pilot operated valve 340. The pressure within line 338 is transmitted through a pilot line 342 to valve 340 with the valve being opened at a predetermined pressure. A drain line 344 from the pilot valve 340 permits drainage of hydraulic fluid to the sump 202 which is received through pilot line 342.

The valve 340 permits the flow of fluid through the valve at pressures in excess of the valve's predetermined opening pressure and also maintains the hydraulic fluid within the telescopic cylinder 84 at a pressure of at least about the opening pressure. By maintaining the pressure of hydraulic fluid within the telescopic cylinder 84, the position of the ejection panel 76, thus, remains relatively fixed. The retention of the ejection panel 76 in a relatively fixed position is also aided by the frictional forces between the slide shoes 108 and 109 and the slide surfaces 110 and 112 of guide slots 100 (see FIG. 6). These frictional forces, which must be overcome during movement of the ejection panel 76, are of assistance in maintaining the ejection panel 76 in a fixed position.

With the ejection panel 76 in a relatively fixed position, hydraulic fluid then flows from line 338 through the open valve 340 to a line 346. Line 346 leads to a reciprocating flow valve 348 whose movement is controlled by a reciprocating control valve 350. With the valve 348 shifted to the right as shown in FIG 14, hydraulic fluid flows from line 346 through valve 348 to a line 352 which leads to the head ends of a pair of stuffer cylinders 94. Also, hydraulic fluid from line 346 flows through a line 347 to the reciprocating control valve 350 which is also shifted to the right as shown in FIG. 14. The hydraulic fluid flows through control valve 350 to a control line 368 which conveys the oil to exert pressure on one end of the reciprocating flow valve 348 to maintain its position shifted to the right.

A branch line 358 leading from line 352 conveys hydraulic fluid to a relief valve 364 which, for example, may be set at a pressure such as 2500 psi. When the relief valve is opened, hydraulic fluid in the line 358 flows through a line 360 and passes through the relief valve 364 to exert a force on the reciprocating control valve 350 which shifts the valve to the left from its position shown in FIG. 14.

The flow of hydraulic fluid to the head ends of cylinders 94 causes the cylinders to extend which extends the stuffer panels 90 as shown in FIG. 8 with the stuffer panels undergoing rotational movement about the pivotal supports 91 to extend into the body of refuse 77.

During extension of stuffer cylinders 94, hydraulic fluid at the rod ends of the stuffer cylinders is withdrawn through a line 354 which conveys the fluid to the reciprocating flow valve 348 to a sump line 355. A branch line 356 leading from line 354 conveys hydraulic fluid to a relief valve 366 which is similar in its operation to the relief valve 364. The relief valve 366 is set at the same pressure as the relief valve 364, such as 2500 psi, and when this presure is reached, the valve 366 is opened to permit the flow of hydraulic fluid from line 356, through a line 362 and relief valve 366 to exert pressure against the reciprocating control valve 350 to shift the valve to its position shown in FIG. 14.

When the hydraulic cylinders 94 are fully extended, there is a build-up in pressure at the head ends of the cylinders and also in the lines 352 and 358. The build-up in pressure is transmitted through line 358 to relief valve 364 with the relief valve shifting when the pressure reaches a predetermined level, such as 2500 psi. Hydraulic fluid then flows through line 360 and relief valve 364 to exert a shifting force against the reciprocating control valve 350, thereby causing the control valve to shift to the left from its position shown in FIG. 14. As soon as the control valve 350 shifts to the left, hydraulic fluid in line 347 flows through control valve 350 to a control line 370 leading to the reciprocating flow valve 348. The hydraulic fluid in line 370 exerts pressure against flow valve 348 and causes the valve to shift to the left from its position shown in FIG. 14.

The hydraulic fluid in line 346 then flows through the shifted flow valve 348 to line 354 leading to the rod ends of hydraulic cylinders 94. This causes the cylinders 94 to contract and to move the stuffer panels 90 from their extended position shown in FIG. 8 to their contracted position of FIG. 7. During contraction of hydraulic cylinders 94, hydraulic fluid at the head ends of the cylinders is withdrawn through line 352 and flow valve 348 to sump line 355.

As described, the reciprocating flow valve 348 and the reciprocating control valve 350 work in unison with the position of the control valve directing hydraulic fluid through either a line 368 or a line 370 to maintain the reciprocating flow valve 348 in either one position or another. Due to the combined action of the reciprocating control valve 350 and the reciprocating flow valve 348, the stuffer cylinders 94 are extended when the valves 350 and 348 are positioned as shown in FIG. 14. When extension of the stuffer cylinders 94 is completed, both the control valve 350 and the flow valve 348 are shifted to the left from their positions shown in FIG. 14 and movement of the stuffer cylinders 94 is then reversed with the stuffer cylinders undergoing contraction. After contraction of the stuffer cylinders 94, the reciprocating control valve 350 and the reciprocating flow valve 348 are again shifted to their position as shown in FIG. 14 and the stuffer cylinders 94 are then extended, etc.

As described previously, the extension of the stuffer panels 90 forms voids or recesses within the refuse 77 which reduces the area of the face 131 of ejection panel 76 that is contacted by refuse. Due to the reduction in the area of face 131 that is contacted by refuse, the pressure within telescopic cylinder 84, which is maintained at a relatively high and constant pressure by the action of valve 340, is sufficient to cause additional rearward movement of the ejection panel 76 and further extension of telescopic cylinder 84. When telescopic cylinder 84 undergoes further extension, there is a drop in the pressure of hydraulic fluid within the telescopic cylinder which is transmitted through line 338 and pilot line 342 to valve 340. This drop in pressure causes valve 340 to close and the reciprocating movement of the stuffer cylinders 94 ceases.

Also, on closing of valve 340 and a reduction in pressure within telescopic cylinder 84, there is a further flow of hydraulic fluid through line 334 to telescopic cylinder 84 which causes the cylinder to extend further until a predetermined pressure is reached which again causes opening of valve 340. The stuffer cylinders 94 then undergo further reciprocating movement to extend and contract the stuffer panels 90. After extension and contraction of the stuffer panels 90, the reduction in the area of the compaction panel 76 which is contacted by refuse may again permit movement of the compaction panel with a reduction in pressure within telescopic cylinder 84 and closing of the valve 340, etc. In this manner, the refuse 77 is packed in a sequential manner first by movement of the compaction panel 76, then by movement of the stuffer panels 90, then by movement of the compaction panel 76, etc.

When it is desired to retract the telescopic cylinder 84 and to move the compaction panel 76 in a forward direction within the refuse storage body 10, the valve 322 is shifted in a direction opposite to the arrow H through movement of the manual shift lever 324. This causes hydraulic fluid to flow from line 317 through valve 322 and into line 336 which conveys the fluid to the telescopic cylinder 84 to cause its contraction. As the telescopic cylinder 84 undergoes contraction, hydraulic fluid within passages of the telescopic cylinder which extend the cylinder is exhausted through line 334 and the valve 322 to a sump line 211.

When it is desired to raise the tailgate 32, as illustrated in FIG. 12, a valve 372 is moved in the direction of the arrow I by a manual shift lever 374. With valve 372, thus, shifted, hydraulic fluid flows from line 306 through valve 372 into a line 375 where the oil passes through a bypass line 377 and a check valve 378 to a line 380 that leads to the head ends of hydraulic cylinders 130. This causes the hydraulic cylinders 130 to extend to raise the tailgate 32 to an elevated position as shown in FIG. 12. During the extension of hydraulic cylinders 130, hydraulic fluid at the rod ends of the cylinders is withdrawn through lines 382 to a line 384 and through valve 372 to sump line 211.

When it is desired to lower the tailgate 32 from its position in FIG. 12 to its position in FIG. 11, the valve 372 is shifted in a direction opposite to the arrow I through movement of the manual shift lever 374. Hydraulic fluid then flows from line 306 through valve 372 to line 384 and into the rod ends of cylinders 130. This causes cylinders 130 to contract with fluid at the head ends of the cylinders being withdrawn through line 380 and through a throttle constrictor 376. The throttle constrictor 376 restricts the flow rate of the hydraulic fluid and thereby controls the rate at which the hydraulic cylinders 130 contract and the tailgate 32 is lowered. After passage through throttle constrictor 376, the hydraulic fluid flows to line 375 and through valve 372 to the sump line 211.

As described previously, the packing mechanism of the present invention is admirably suited for packing refuse within a refuse storage body mounted on a truck vehicle as the vehicle is moved over the road to a new refuse pick-up location. In this usage of the packing mechanism, hydraulic fluid may be supplied to the packing mechanism through a "Multiple Pump Control System" as described in commonly assigned U.S. application Ser. No. 402,292, filed Oct. 1, 1973, whose disclosure is incorporated herein by reference.

Figure 16:
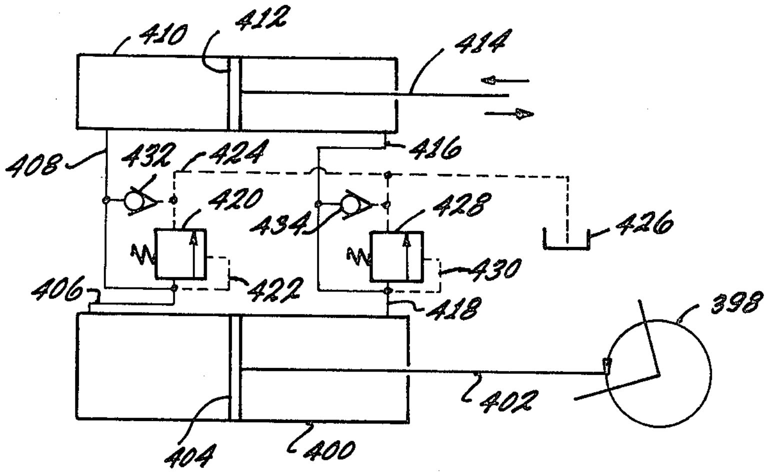
FIG. 16 is a schematic drawing of another embodiment of hydraulic circuitry for operating a top closure member.

In one embodiment of the invention, as described in FIG. 14, hydraulic cylinders 56 may be actuated by hydraulic fluid which is received by the cylinders 56 from a line 222 connected to the rod end of one of the hydraulic cylinders 16. In another embodiment of the invention, as illustrated in FIG. 16, the hydraulic system for operation of the roof door mechanism may be self-contained and not be connected hydraulically to the system for actuation of the cylinders 16 or the hydraulic cylinders 22 as illustrated in FIG. 14. In using the hydraulic system illustrated in FIG. 16, the hydraulic system of FIG. 14 is modified by removing the portion of the system which pertains to actuation of the cylinders 56. This may be viewed in terms of severance lines 392, 394 and 396 shown in FIG. 14 with the severance lines indicating removal of that portion of the system which pertains to actuation of hydraulic cylinders 56. As thus modified, the line 226 and that portion of the system which it supplies is eliminated as shown by severance line 392. Similarly, the pilot line 30 is eliminated as shown by severance line 394 and the line 256 is also eliminated as shown by severance line 396. As thus modified, the remainder of the system functions to actuate the cylinders 16 in raising and lowering the lifting arms 12 and to actuate the hydraulic cylinders 22 in rotation of the fork arms 18 with respect to the lifting arms 12.

The portion of the hydraulic system which may be eliminated as indicated by severance lines 392, 394 and 396 in FIG. 14 is, as stated, replaced by a self-contained hydraulic system as illustrated in FIG. 16. As shown in FIG. 16, a spool 398 is connected to lifting arms 12 and is rotated during raising and lowering of the lifting arms. The spool 398 is connected to a master cylinder 400 through a piston rod 402 connected to a piston 404. As the spool 398 undergoes rotation during raising or lowering of the lifting arms 12, the spool 398 drives the piston rod 402 in either one direction or another to cause movement of piston 404 within the master cylinder 400.

Assuming the master cylinder 400 to be full of hydraulic fluid, as the piston rod 402 is moved to the left from its position shown in FIG. 16, hydraulic fluid at the head end of the master cylinder is expelled through a line 406 to a line 408 and into the head end of a roof door cylinder 410. The roof door cylinder 410 includes a piston 412 connected to a piston rod 414 which is in turn connected to a roof door. As hydraulic fluid is received at the head end of roof door cylinder 410, piston 412 is moved to the right from its position shown in FIG. 16 which causes closing of the roof door.

As piston 412 moves to the right from its position shown in FIG. 16, hydraulic fluid at the rod end of cylinder 410 is expelled through a line 416 to a line 418 and into the rod end of master cylinder 400. The roof door cylinder 410 is, thus, slaved to the master cylinder 400 such that contraction of the master cylinder causes a corresponding extension of the roof door cylinder. When rod 402 is moved to the right from its position shown in FIG. 16 due to rotational movement of spool 398, fluid is forced from the rod end of the master cylinder 400 through lines 418 and 416 to the rod end of roof door cylinder 410. This causes piston 412 to move to the left from its position shown in FIG. 16 with the roof door cylinder 410, thus, undergoing contraction to open the roof door. As roof door cylinder 410 undergoes contraction, hydraulic fluid at the head end of the roof door cylinder is expelled through lines 408 and 406 and into the head end of master cylinder 400. Thus, as the master cylinder 400 is extended, the roof door cylinder 410 is slaved to the master cylinder and undergoes contraction.

As illustrated, a pilot operated valve 420 is connected to line 406 and is controlled by a pilot line 422 leading to line 406. In maintaining synchronous movement of the master cylinder 400 and the roof door cylinder 410, the fluid capacity of the master cylinder is desirably somewhat larger than that of the roof door cylinder. Thus, for example, during contraction of master cylinder 400, the roof door cylinder 410 will complete its expansion somewhat prior to completion of the contraction of the master cylinder. At this point, there will be a build up in pressure in line 406 which is transmitted through pilot line 422 to cause opening of the pilot valve 420. This permits the flow of fluid from line 406 through valve 420 to a line 424 leading to a tank 426 during the completion of the contraction stroke of master cylinder 400.

With the master cylinder 400 then completely contracted and the roof door cylinder 410 completely extended, the master cylinder may then undergo extension through movment of the piston 404 to the right from its position shown in FIG. 16. As piston 404 moves to the right, hydraulic fluid at the rod end of master cylinder 400 is forced through lines 418 and 416 to the rod end of roof door cylinder 410. The roof door cylinder 410 will complete its contraction slightly ahead of the completion of the extension stroke of the master cylinder 400 due to the somewhat larger capacity of the master cylinder. When the roof door cylinder 410 has completed its contraction stroke, there will be a build up in pressure in line 418 during completion of the extension stroke of the master cylinder 400. A pilot valve 428 is connected to line 418 and is controlled by a pilot line 430 which leads from pilot valve 428 to line 418. Due to the build up in pressure in line 418, the valve 428 will open to permit the flow of fluid from line 418 to line 424 and to the tank 426. As the master cylinder 400 completes its extension stroke, the pressure at the head end of the master cylinder will be reduced since the volume of the master cylinder at its head end is continuing to increase through movement of the piston 404 but there is no more hydraulic fluid available from the roof door cylinder 410 which is now completely contracted. This decrease in pressure at the head end of master cylinder 400 causes fluid to flow from line 424 through a check valve 432 into line 408 to supply the additional hydraulic fluid needed to keep the head end of the master cylinder full of fluid. The hydraulic fluid in line 424 which is fed through check valve 432 may, of course, be fluid that is received from line 418 through opening of the pilot valve 428 or the hydraulic fluid in line 424 may be received from tank 426 to supply fluid to the head end of master cylinder 400.

A check valve 434 which leads from line 424 to line 416 functions in a similar manner to the check valve 432. During completion of the contraction stroke of master cylinder 400 when the roof door cylinder 410 is completely extended, hydraulic fluid may flow from line 424 through check valve 434 to line 416 to replenish the supply of hydraulic fluid at the rod end of the master cylinder. In this manner, the master cylinder 400 and the roof door cylinder 410 may be brought into synchronization at the end of each stroke of the master cylinder. Additionally, the pilot operated valves 420 and 428 serve a further function. The pilot operated valve 420, for example, may open during the contraction of the master cylinder 400 if there is an obstruction of some sort which prevents extension of the roof door cylinder 410. As will be described, during extension of the roof door cylinder 410, the roof door is moved downwardly and, in so doing, exerts a downwardly directed packing force against any refuse which is contacted by the door. The extension stroke of the roof door cylinder 410 is, thus, a power stroke and, the opening pressure of the pilot valve 420 may, therefore, be set relatively high.

During the extension stroke of master cylinder 400, the roof door cylinder 410 is contracted which opens the roof door. Since this movement of the roof door cylinder 410 is not a power stroke, the opening pressure for the pilot valve 428 may be set considerably lower than the opening pressure for the pilot valve 420.

Figure 15:
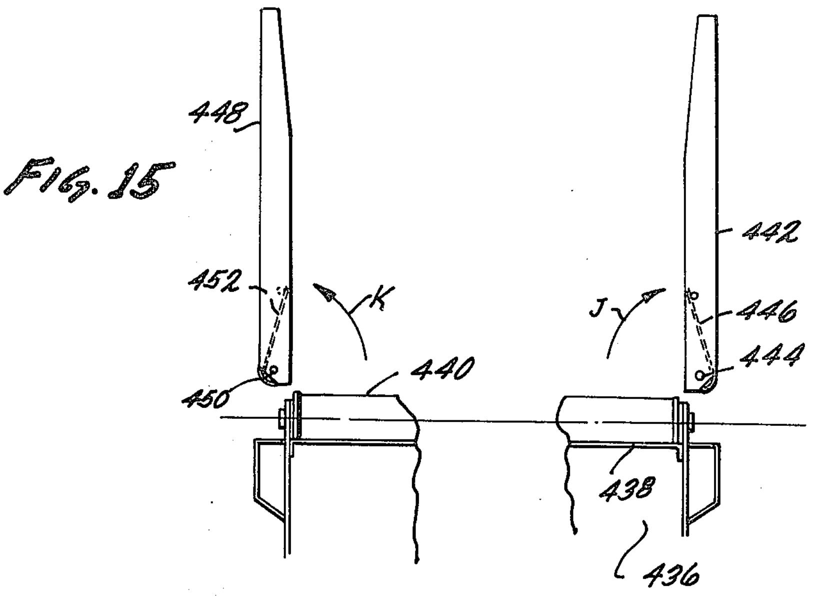
FIG. 15 is a front elevational view of a further embodiment of a top closure member with wind screens mounted along the sides of the closure member.

Turning to FIG. 15, which is a partial front view of the roof door in a closed position from the roof door as viewed in a closed position from the front of the refuse storage body, the front of the refuse storage body is indicated as 436. The roof line is indicated as 438 with a roof door 440 shown in a closed position resting against the roof line 438. During opening of the roof door 440, the door may be pivoted upwardly and rearwardly with respect to the refuse storage body. A wind screen 442 is positioned along one side of the roof door 440 through a pivotal connection 444 with the wind screen 442 being urged to a lowered position by a spring 446. Similarly, a wind screen 448 is positioned along the other side of the door 440 through a pivotal connection 450 with the wind screen 448 being urged to a lowered position by a spring 452. During upward rotational movement of the roof door 440, the sides of the roof door contact the wind screens 442 and 448 with the movement of the roof door, thereby, urging the wind screens to the upright position shown in FIG. 15.

In movement of the wind screen 442 to an upright position, the wind screen undergoes rotational movement as indicated by the arrow J while wind screen 448 undergoes rotational movement as indicated by the arrow K. With the roof door 440 in an opened position, the wind screens 442 and 448 may be maintained in an upright position as shown in FIG. 15 through contact with the roof door. The upper opening into the refuse storage body is, thereby, shielded on both sides by the upright wind screens 442 and 448 and on a third side by the opened roof door 440. During closing of the roof door 440, the wind screens 442 and 448 each undergo downward rotation in a direction opposite the arrows J and K. If desired, bumpers may be placed on the top of the roof door 440 to cushion the impact of the wind screens 442 and 448 against the roof door at the end of their downward rotational movement and also to prevent the wind screens from rattling when positioned downwardly against the roof door. The roof door 440 has a width which is preferably equal to at least twice the height of the wind screens 442 or 448. Thus, when the wind screens 442 and 448 are in their lowered position, the ends of the wind screens may be positioned closely adjacent to each other along the center line of the roof door 440.

Figure 17:
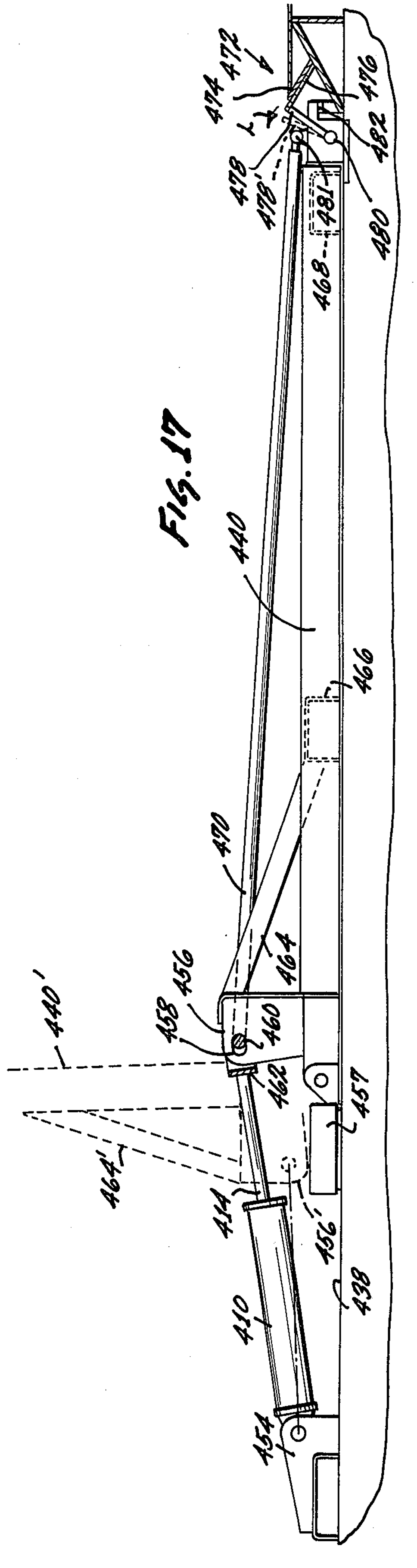
FIG. 17 is a side elevational view, partly in section, of the top closure member of FIG. 15.

Turning to FIG. 17, which is a partial side elevational view of the roof door, with certain of the structure shown in section, the roof door 440 is illustrated in its closed position as being flush against the roof line 438 to close the upper opening into the refuse storage body. The roof door cylinder 410, as described in regard to FIG. 16, may be pivotally connected to the roof door 440 at a point along the mid-line of the roof door. A support bracket 454 mounted on the roof of the refuse storage body pivotally supports one end of the hydraulic cylinder 410 while a rod bracket 456 mounted on the top of roof door 440 is pivotally connected to the piston rod 414. An oval opening 458 in the bracket 456 receives a pin 460 which may be connected to the piston rod 414 through a clevis 462. A diagonal brace 464 leads from the bracket 456 to a cross member 466 of the roof door 440. Additional cross members may also be provided in the structure of the roof door 440, as illustrated by a cross member 468 positioned adjacent the forward edge of the roof door 440.

A connecting rod 470 is joined to the clevis 462 of piston rod 414 in any suitable manner with the outer end of the connecting rod 470 being connected to a latch assembly indicated generally as 472. The latch assembly 472 may include a support member 474 secured to a latch plate 476. A rotatable latch member 478 that is connected to the door 440 through a pivotal connection 480 contacts and is positioned beneath the latch plate 476 when the latch member occupies the position shown in solid line drawing in FIG. 17 and the door is locked to the top of the refuse storage body. The connecting rod 470 is connected to latch member 478 through a pivotal connection 481 with the movement of the latch member being controlled by movement of the connecting rod. During opening of the roof door 440, the hydraulic cylinder 410 undergoes contraction to cause an initial movement of piston rod 414. The initial movement of piston rod 414 causes movement of the pin 460 within oval opening 458. Due to the shape of oval opening 458 with respect to that of the pin 460, relative movement occurs between the pin 460 and the bracket 456 without producing any rotational movement of the roof door 440.

The initial movement of the piston rod 414 does, however, cause movement of the connecting rod 470 to produce translation of the connecting rod in a direction to the left from that shown in FIG. 17 to move the rotatable latch member 478 in the direction of arrow L from its locked solid line position to an unlocked position shown in phantom line drawing as 478'. With the latch mechanism 472, thus, unlocked, the pin 460 then contacts the end of the oval opening 458 and, at this point, the roof door 440 begins upward rotational movement about a pivotal connection 483 between the roof door and the top of the refuse storage body. At the end of the upward rotational movement of the roof door 440, the door occupies an upright position shown in phantom line drawing as 440' with the diagonal brace occupying a phantom line position 464' and the bracket 456 occupying a phantom line position 456'. In its phantom line position 456', the bracket 456 bears against a cushioning member or stop 457.

During downward rotational movement of the roof door from its phantom line position 440' to its solid line position 440, the roof door cylinder 410 undergoes extension. When the roof door reaches its down position 440, the pin 460 will be at the right of the oval opening 458 as shown in FIG. 17 and the latch member 478 will be in its solid line position. Due to the resiliency of the latch plate 476, the latch member 478 may bend the latch plate slightly upwardly with the latch member sliding under the latch plate to automatically lock the roof door 440 in position as the roof door is closed. As indicated, the roof door 440 may include a recessed portion which forms a contact area 482 at the front portion of the roof door that bears against the supporting structure of the latch assembly 472 when the roof door is closed.

Figure 18:
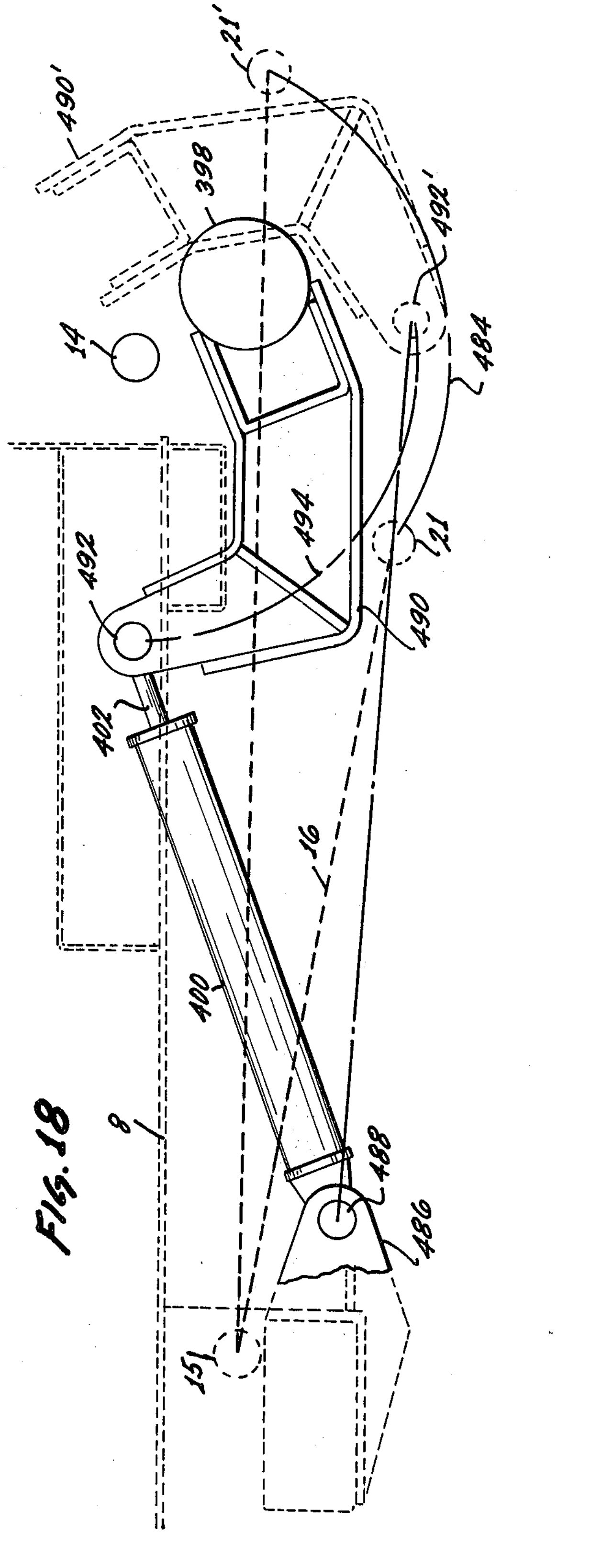
FIG. 18 is a side elevational view of a master cylinder used in the hydraulic circuit of FIG. 16 showing the manner in which the master cylinder may be mounted for actuation through raising or lowering of the lifting arms.

FIG. 18 is a partial side view of the master cylinder 400 illustrating the manner in which the master cylinder may be actuated in response to movement of the lifting arms 12. In viewing FIG. 18, it may be helpful to view this figure in conjunction with FIGS. 2 and 3 as previously described. As illustrated in FIGS. 2 and 3, the lifting arms 12 may be pivotally connected to the refuse storage body 10 through pivotal mountings 14. Similarly, the lifting arm cylinders 16 may be pivotally connected to the refuse storage body through pivotal mountings 15 while the piston rods 19 of the lifting arm cylinders are connected to the lifting arms 12 through pivotal mountings 21.

Now, referring again to FIG. 18, the position of the hydraulic cylinder 16 with the lifting arms 12 in a lowered position is indicated by a dotted line 16 which interconnects two dotted line circles 15 and 21 that correspond to the position of the pivotal mountings 15 and 21 when the cylinder 16 is contracted. During extension of the hydraulic cylinder 16, the pivotal connections between the rods 19 and lifting arms 12, indicated by the dotted line circle 21, will undergo movement along an arc 484 with the dotted line circle 21 moving to a new position indicated as 21' which is the position that may be occupied by the pivotal mountings 21 with the lifting arms 12 in a raised position as illustrated in FIG. 3. The master cylinder 400, as described in FIG. 16, may be connected at one end to a support bracket 486 secured in any suitable manner to the vehicle chassis 8 or to the refuse storage body 10, through a pivotal connection 488. The piston rod 402 of master cylinder 400 may be connected to a lost motion arm 490 through a pivotal connection 492 with the lost motion arm being connected to the spool 398, as described in FIG. 16, which is secured in any suitable manner to the lifting arms 12.

As the lifting arms 12 undergo upward rotational movement with the pivotal connections between the cylinders 16 and the lifting arms undergoing movement from position 21 to position 21', the spool 398 will undergo rotational movement to move the lost motion arm from its solid line position 490 to a phantom line position 490'. As this occurs, the pivotal connection 492 between rod 402 and the lost motion arm 490 will undergo movement along an arc 494 to a new position indicated in phantom line drawing as 492'. Due to the position of the master cylinder 400 relative to the lost motion arm 490, the shape of the lost motion arm, and also its position relative to the lifting arms 12, the movement of the pivotal connection 492 along the arc 494 produces little or no movement of the master cylinder 400 during raising of the lifting arms 12 to an upwardly inclined position of approximately 45°. However, from this point on, the movement of the pivotal connection 492 along the arc 494 produces extension of the master cylinder 400 and contraction of the roof door cylinder 410, as described in FIG. 16, to open the roof door. Similarly, during the movement of the lifting arms 12 from their dotted line position 12' shown in FIG. 3 to a vertical inclination of approximately 45°, the master cylinder 400 is driven by the lost motion arm 490 to produce contraction of the master cylinder and extension of the roof door cylinder 410 in closing the roof door.

Desirably, the master cylinder 400 may be driven at a higher rate near the end of the power stroke of the roof door cylinder 410 when the roof door cylinder is undergoing extension to close the roof door 440 and to apply a packing force against refuse that is contacted by the roof door. Thus, the shape and position of the lost motion arm 490 and its location with respect to the lifting arms 12 is preferably such as to drive the master cylinder 400 at a higher rate during this portion of the power stroke of the roof door cylinder 410.

Preferably, the roof door mechanism and controls are as indicated in FIGS. 15–18 since this provides a self-contained control system for opening and closing of the roof door. However, if desired, the control system illustrated in FIG. 14 may also be employed in opening and closing of the roof door.

Figure 19:
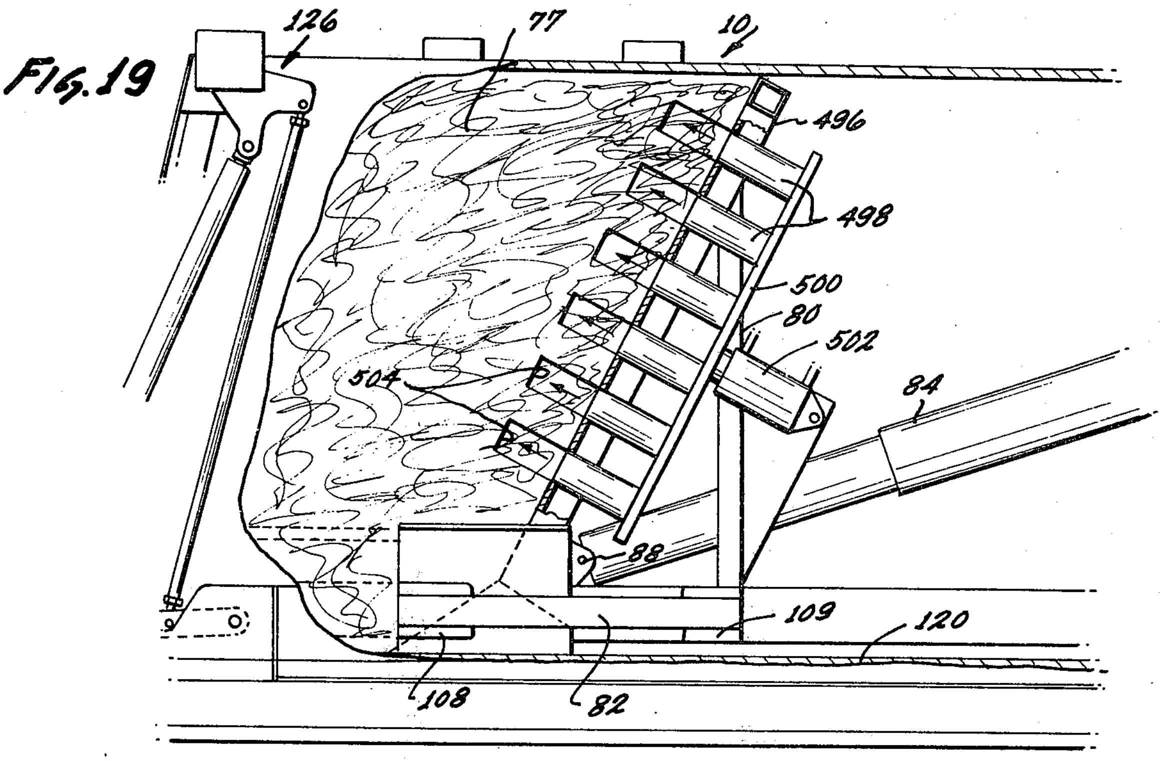
FIG. 19 is a partial side sectional view, similar to FIG. 8, showing another embodiment of stuffer panels and a compaction panel.
Figure 20:
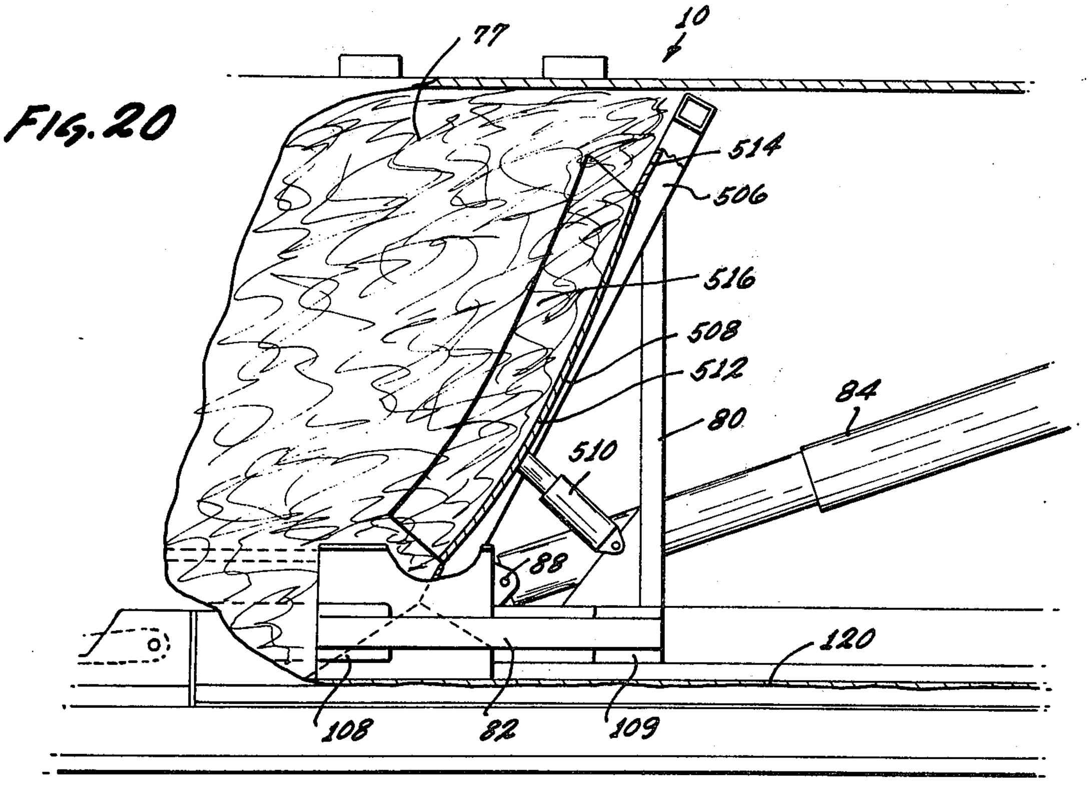
FIG. 20 is a partial side sectional view, similar to FIG. 8 showing still another embodiment of a stuffer panel and a compaction panel.

FIGS. 19 and 20 are partial side sectional views of the refuse storage body, similar to FIGS. 7 and 8, which illustrate other embodiments of a stuffer panel and compaction panel in addition to the preferred embodiment described in FIGS. 7 and 8. For ease in description, the reference numerals employed in FIGS. 19 and 20 are the same as those previously employed in FIGS. 6–8 where applicable.

Turning to FIG. 19, a compaction panel 496 which is driven through extension or contraction of a telescopic cylinder 84, as described previously, includes a plurality of stuffer panels 498 which may be tied together for synchronized movement by connection to a stuffer panel frame 500. The stuffer panel frame 500 may be actuated through extension or contraction of a stuffer cylinder 502 with the cylinder 502 and the telescopic cylinder 84 being capable of operation in an intermittent fashion as described previously in regard to FIG. 14.

On actuation of the stuffer cylinder 502, the stuffer panels 498 may undergo movement in the direction of the arrows shown in FIG. 19 to form a plurality of voids 504 within the body of refuse 77. As illustrated, with the stuffer cylinder 502 in contracted position, the compaction surfaces of the stuffer panels 498 may be substantially coextensive with the compaction surface of the compaction panel 496. As described previously, the voids 504 formed within the body of refuse 77 will reduce the area of the compaction surface of the compaction panel which is in contact with refuse. This, then, permits the application of a greater force per unit area to the refuse 77 through the compaction surface of the compaction panel 496 to permit further extension of the telescopic cylinder 84, etc.

Turning to FIG. 20, another embodiment of a packing mechanism of the invention may include a compaction panel 506 and a stuffer panel 508 which is actuated through extension and contraction of a stuffer cylinder 510. The stuffer panel 508 may include an upwardly curved compaction surface 512 with extension of the stuffer cylinder 510 exerting an upwardly directed force against the body of refuse 77 in forming a void 516. With the stuffer cylinder 510 contracted, the compaction surface 512, as indicated, will not be completely coextensive with the compaction surface 514 of the compaction panel 506.

I claim:

1. A refuse compactor comprising:

a refuse storage body having a rear wall, a front wall, a bottom wall and side walls defining an enclosure;

a compaction panel movable in a rearward direction within said storage body to give refuse within said storage body an initial pack of a first particular maximum pressure against the rear wall of the storage body;

at least on stuffer panel defining a portion of the compaction panel in a first position and movable within said body relative to said compaction panel in a rearward direction to a second position to give the refuse in said body a secondary pack, of a second particular maximum pressure greater than the first particular maximum pressure, against the rear wall of the storage body, and control means operatively coupled to said compaction panel and said stuffer panel to move said compaction panel in the rearward direction, with the stuffer panel in the first position, until the production of the first particular maximum pressure against the compaction panel and then to move said stuffer panel between the first and second positions, with the compaction panel stationary, until the production of the second particular maximum pressure against the compaction panel and then to move the compaction panel from the stationary position with the stuffer panel in the first position.

2. The refuse compactor of claim 1 wherein the control means are operative to provide the second particular pressure with a lesser magnitude than the first particular pressure.

3. The refuse compactor of claim 1 wherein said compaction panel has a larger compaction surface than said stuffer panel.

4. The refuse compactor of claim 1 including a plurality of stuffer panels movable within said body to give the refuse within the panel a secondary pack and wherein the stuffer panels have compaction surfaces co-operative with the compaction surfaces of the compaction panel in the first position of the stuffer panels.

5. The refuse compactor of claim 1 including compaction surfaces on said stuffer panels, and said compaction surfaces inclined upwardly with respect to said refuse storage body, whereby movement of said stuffer panels provides a plurality of upwardly directed packing forces to the refuse within said storage body.

6. A refuse compactor comprising:

a refuse storage body;

a compaction panel movable within said storage body to give refuse within said body an initial pack;

a stuffer panel movable rearwardly within said body with an upward component which has a greater upward inclination than the packing force applied to the refuse by movement of said compaction panel to give refuse in said body a secondary pack;

said storage body having an upper and a lower portion, and the secondary pack applied to refuse by movement of said stuffer panel having the upward component of movement which has a greater upward inclination than the packing force applied to the refuse by movement of said compaction panel.

7. The refuse compactor of claim 6 wherein said stuffer panel has a shape and a movement which provides a greater upward movement to refuse in said lower portion of said refuse storage body than to refuse in said upper portion of said refuse storage body.

8. The refuse compactor of claim 7 wherein the movement of said stuffer panel provides an upward component of movement to the refuse which increases in its extent of upward inclination during movement of said stuffer panel.

9. The refuse compactor of claim 6 wherein the movement of said stuffer panel provides an upward component of movement to the refuse which increases in its extent of upward inclination during movement of said stuffer panel.

10. The refuse compactor of claim 9 wherein said stuffer panel is pivotally mounted within said refuse container, and said stuffer panel undergoes rotational movement in an upward and rearward direction with respect to said refuse storage body in providing a secondary pack to refuse within said body.

11. The refuse compactor of claim 10 wherein said stuffer panel is pivotally mounted on said compaction panel.

12. The refuse compactor of claim 11 wherein the movement of said stuffer panel in providing the refuse with a secondary pack applies a higher packing pressure to the refuse than the packing pressure applied to the refuse by the movement of said compaction panel.

13. A refuse compactor comprising:

a refuse, storage body having a rear wall, a bottom wall, a front wall and side walls defining an enclosure;

a compaction panel movable within said storage body between the front and rear walls of the storage body to give refuse in said body an initial pack against the rear wall of the refuse storage body;

first hydraulic motor means connected to said compaction panel to move the compaction panel between the front and rear walls of the storage body;

a stuffer panel disposed in cooperative relationship with the compaction panel for movement with the compaction panel and movable within said body in a rearward direction relative to said compaction panel to give the refuse in the body a secondary pack against the rear wall of the storage body;

second hydraulic motor means connected to said stuffer panel to provide movement to said stuffer panel relative to said compaction panel within said storage body;

means for supplying hydraulic fluid to said first and second motor means;

first control means for providing a controlled flow of the hydraulic fluid to said first motor means to provide movement to said compaction panel until the compaction resistance of refuse contacted by said compaction panel raises the pressure of hydraulic fluid within said first motor means to a first particular level;

second control means for providing a controlled flow of hydraulic fluid to said second motor means, upon the production of the first particular level of hydraulic pressure within the first motor means, to actuate said stuffer panel in providing a secondary pack to refuse within said storage body until the compaction pressure of the refuse against the compaction panel decreases the pressure of the hydraulic fluid within said first motor means to a second particular level less than said predetermined level; and third control means responsive to the production of the second particular level in the pressure of the hydraulic fluid within the first motor means for discontinuing the operation of the second control means in producing a flow of the hydraulic fluid through the second motor means and for initiating an operation of the first control means in producing a controlled flow of fluid through the first motor means.

14. The refuse compactor of claim 13 including:

the second control means including fourth control means which controls the direction of flow of hydraulic fluid to said second motor means, and said fourth control means alternately changing the flow direction of fluid to said second motor means to alternately move said stuffer panel to an extended position in the rearward direction and then to a contracted position in the forward direction, whereby said stuffer panel is moved in one direction and then in another in applying a multiple of secondary packing strokes to refuse within said storage body.

15. The refuse compactor of claim 13 wherein:

said first motor means and said second motor means are connected in series in a hydraulic circuit and wherein the first, second and third control means are included in the hydraulic circuit with the first and second motor means.

16. The refuse compactor of claim 15 wherein:

said first motor means is connected in said hydraulic circuit relative to said second motor means to provide for a flow of the hydraulic fluid through said first motor means before said second motor means.

17. The refuse compactor of claim 6 wherein:

said second control means is connected in said hydraulic circuit relative to said first motor means and said second motor means to provide for the flow of hydraulic fluid from said first motor means to said second motor means when the pressure of hydraulic fluid in said first motor reaches said first particular level, and wherein said second control means is operative to maintain the pressure of hydraulic fluid within said first motor means at substantially said first particular level when the pressure of the hydraulic fluid reaches said first particular level.

18. The refuse compactor of claim 13 wherein:

the second control means is operative to reverse the direction of the flow of fluid through the second motor means when the pressure of the fluid flowing through the second motor means reaches a third particular level greater than the first particular level to provide for a movement of the stuffer panel in the forward direction and wherein the second control means is operative to produce the third particular pressure in the second motor means at the end of the rearward movement of the stuffer panel.

19. In combination in refuse equipment, a refuse storage body having a front wall, a rear wall, a bottom wall and side walls defining an enclosure, a compaction panel movable within the storage body between the front and rear walls of the storage body for compacting the refuse within the storage body against the rear wall of the storage body, first means operatively coupled to the compaction panel for moving the compaction panel within the storage body in a rearward direction to provide a compaction of refuse against the compaction panel to a first packing pressure, second means operatively coupled to the compaction panel within the storage body for moving a portion of the compaction panel in the rearward direction relative to the remainder of the compaction panel against the rear wall to provide a compaction of refuse against the compaction panel to a second packing pressure less than the first packing pressure and thereafter in a forward direction to return the portion of the compaction panel to its position in operative relationship with the remainder of the compaction panel and, third means operatively coupled to the second and third means for initially obtaining the movement of the compaction panel in the rearward direction until the production of the first packing pressure in the refuse in the storage body and for thereafter obtaining the movement of at least the portion of the compaction panel in the rearward and forward direction until the production of the second packing pressure of the refuse in the storage body against the compaction panel, and fourth means response to the production of the second packing pressure of the refuse in the storage body against the compaction panel and operatively associated with the second and third means for initiating a new cycle of operation of the second and third means to initially move the compaction panel in the refuse body in the rearward direction until the production of the first packing pressure of the refuse in the storage body against the compaction panel and in the refuse body in the rearward and forward directions until the production of the second packing pressure of the refuse in the storage body against the compaction panel.

20. In combination in refuse equipment, a storage body having a front wall, a rear wall, a bottom wall and side walls defining an enclosure for the storage of refuse, means providing an opening into the storage body from a position above the storage body to provide for the insertion of refuse into the storage body, a compaction panel movable longitudinally in the storage body to provide a compaction of refuse against the rear wall of the storage body in accordance with such longitudinal movement, stuffer means operatively coupled to the compaction panel for movement with the compaction panel and movable relative to the compaction panel in the rearward direction to provide a packing of the refuse in the storage body at localized positions and thereafter movable in the forward direction relative to the compaction panel, first hydraulic means operatively coupled to the compaction panel to provide a movement of the compaction panel in the longitudinal direction until the imposition of a first packing pressure against the compaction panel by the refuse in the storage body, second hydraulic means operatively coupled to the stuffer means to provide a movement of the stuffer means in the rearward direction until the imposition of a second packing pressure against the stuffer means by the refuse in the storage body where the second packing pressure is greater than the first packing pressure and for thereafter providing a movement of the stuffer means in the forward direction to retract the stuffer means, and third hydraulic means operatively coupled to the first and second hydraulic means for sequencing the first and second hydraulic means through a plurality of cycles of operation for the movement of the compaction panel in the rearward direction in the storage body until the imposition of the first packing pressure against the compaction panel and then the reciprocatory movements of the compaction panel in the rearward and forward directions until the imposition of the second packing pressure against the stuffer means.

21. In the combination set forth in claim 20, the storage body being provided with a roof and the roof of the storage body being braced to support the load imposed upon the roof upon a longitudinal and upward movement of the refuse by the stuffer means to the second packing pressure.

22. In the combination set forth in claim 20, the sides of the storage body being provided with slide surfaces and the compaction panel being provided with shoes for engaging the slide surfaces to brace the compaction panel during the movement of the compaction panel.

23. In combination for packing refuse, a storage body having a front wall, a rear wall, a bottom wall and side walls defining an enclosure for the storage of the refuse, a compaction panel disposed in the storage body for controlled movements between the front and rear walls of the storage body and for the packing of the refuse in the storage body, at least one stuffer panel movable between first and second positions, the stuffer panel being disposed in the first position to define a portion of the compaction panel and being disposed in the second position in displaced relationship from the compaction panel in the direction of the rear wall of the storage body, first means included in the storage body for providing for the insertion of refuse into the storage body, second means operatively coupled to the compaction panel for providing for controlled movements of the compaction panel toward the rear wall of the storage body to pack the refuse in the storage body against the rear wall of the storage body, third means operatively coupled to the stuffer panel for providing for controlled movements on a reciprocating basis of the stuffer panel toward the rear wall of the storage panel to provide a further pack of the refuse in the storage body and toward the compaction panel, fourth means operatively coupled to the second and third means for providing for the reciprocative operation of the third means and the interruption in the operation of the second means upon the exertion by the refuse of a first particular pressure against the compaction panel and for thereafter providing for the operation of the second means and an interruption in the operation of the third means upon the exertion against the compaction panel of a second particular pressure less than the first particular pressure, and fifth means operatively coupled to the rear wall of the storage means for producing a displacement of the rear wall from the storage body to provide for a removal by the compaction panel of the refuse from the storage body.

24. The combination set forth in claim 23 wherein the fourth means are operative to provide on a repetitive basis for progressive movements of the compaction panel toward the rear wall of the storage body until the production of the first particular pressure against the compaction panel and then for reciprocatory movements of the stuffer panel toward the rear wall of the storage body and toward the compaction panel.

25. The combination set forth in claim 24 wherein the storage body is provided with a top wall and wherein means are included for receiving refuse at a position in front of the front wall of the storage body and for inserting the refuse into the storage body through the top wall of the storage body.

26. The combination set forth in claim 24 wherein the fifth means are operative in one state to seal the rear wall to the storage body to prevent liquids in the refuse from leaking from the storage body and are operative in the second state to displace the rear wall from the sealed relationship with the storage body to provide for the removal by the compaction panel of the refuse from the storage body.

27. The combination set forth in claim 26 wherein lifting arms extend forwardly from the front wall of the storage body and are pivotable upwardly and rearwardly and are constructed to receive containers holding refuse and wherein means are provided to produce the pivotable movement of the lifting arms and wherein the storage body is provided with a top wall and wherein the top wall is provided with an opening and wherein closure means are provided adjacent the opening in the top wall and wherein the closure means are movable between a first position closing the opening in the top wall and a second position uncovering the opening in the top wall and wherein means are provided for operating the closure means in synchronism with the pivotal movement of the lifting arms to uncover the opening when the lifting arms have pivoted the container to a position above the opening and to cover the opening when the lifting arms have pivoted the container to a position in front of the front wall of the storage body.

28. In combination for packing refuse, a storage body having a front wall and a rear wall and a pair of side walls defining a closed compartment, a compaction panel disposed in the storage body for movement between the front and rear walls of the storage body, the side walls of the storage body being formed to define detents extending between the front and rear walls of the storage body, detent means connected to the compaction panel for movement with the compaction panel and cooperative with the detents in the side walls of the storage body to brace the compaction panel during the movement of the compaction panel between the front and rear walls of the storage body, first means for providing a controlled movement of the compaction panel between the front and rear walls of the storage body to compact the refuse in the storage body, at least one stuffer panel disposed in cooperative relationship with the compaction panel for movement between first and second positions and disposed in the first position to define a portion of the compaction panel and disposed in the second position in displaced relationship from the compaction panel towards the rear wall of the storage body, second means for providing controlled movements of the stuffer panel between the first and second positions, and third means operatively coupled to the first and second means for alternately providing for controlled movements of the compaction panel until the production of a particular pressure by the refuse in the storage body against the compaction panel and for thereafter providing for controlled movements of the stuffer panel between the first and second positions until a particular reduction of the pressure by the refuse against the compaction panel below the particular pressure.

29. The combination set forth in claim 28 wherein the third means are operative to provide for reciprocation of the stuffer panel through more than one cycle between the first and second positions to obtain the particular reduction in the pressure by the refuse against the compaction panel and are then operative to provide for further movement of the compaction panel between the front and rear walls of the storage body.

30. The combination set forth in claim 28 wherein the compaction panel is constructed and disposed to equalize pressure of the refuse against the compaction panel at different positions on the compaction panel and the stuffer panel is constructed and is movable between the first and second positions to further equalize pressure of the refuse against the compaction panel at different positions on the compaction panel.

31. The combination set forth in claim 30 wherein the compaction panel is angled upwardly toward the front wall of the storage body and wherein the stuffer panel is movable rearwardly toward the second position and is movable upwardly during its movement toward the rear wall of the storage body.

32. The combination set forth in claim 28 wherein the compaction panel includes guard plates to shield the detents in the side walls of the storage body and the detent means against the refuse in the storage body.

33. The combination set forth in claim 32 wherein the compaction panel is constructed to produce an upward force against the refuse during the movement of the compaction panel between the front and rear walls of the storage body and wherein the bottom of the compaction panel is constructed to produce an additional upward force on the refuse during the movement of the compaction panel between the front and rear walls of the storage body and wherein the stuffer panel is constructed to produce upward forces of progressively increasing magnitude on the refuse at progressively lower positions on the stuffer panel during the reciprocatory movement of the stuffer panel.

34. In combination for packing refuse, a storage body having a front wall, a rear wall, a bottom wall and side walls defining an enclosure for the storage of refuse, a compaction panel disposed in the storage body for movement between the front and rear walls of the storage body, at least one stuffer panel disposed in the storage body in cooperative relationship with the compaction panel for movement with the compaction panel between the front and rear walls of the storage body and movable between a first position cooperative with the compaction panel and a second position displaced from the compaction panel, first means for providing a movement of the compaction panel between the front and rear walls of the compaction panel, second means for providing a reciprocatory movement of the stuffer panel between the first and second positions, third means responsive to the exertion by the refuse of a first particular pressure against the compaction panel for discontinuing the operation of the first means and instituting an operation of the second means and responsive to the exertion by the refuse of a second particular pressure less than the first particular pressure for discontinuing the operation of the second means and instituting an operation of the first means, the storage body having a top wall with an opening in the top wall for the insertion of refuse into the storage body, and fourth means disposed in cooperative relationship with the storage body and pivotable between a first position in front of the front wall of the storage body and a second position above the top wall of the storage body to provide for a transfer of refuse into the storage body from a position in front of the storage body.

35. The combination set forth in claim 34 wherein the stuffer panel is movable upwardly from the first position to the second position to distribute upwardly the weight of the refuse in the storage body and wherein the second means provides such a movement.

36. The combination set forth in claim 34 wherein the compaction panel is inclined to distribute the weight of the refuse upwardly and the bottom of the compaction panel is further inclined to provide a further distribution of the weight of the refuse upwardly.

37. The combination set forth in claim 34 wherein fifth means are disposed in contiguous relationship to the opening in the top wall of the storage body and are movable between a first position retaining the opening in the top wall of the storage body and a second position closing the opening in the top wall of the storage body and wherein sixth means are included for coordinating the movement of the fourth means between the first and second positions and the fifth means between the first and second positions.

38. The combination recited in claim 37 wherein the rear wall of the storage body is movable between a first position defining the enclosure with the side walls and the front wall of the storage body and a second position spaced from the side walls of the storage body and wherein seventh means are provided for moving the rear wall of the storage body from the first position to the second position to provide for the removal by the compaction panel of the refuse from the storage body.

39. The combination recited in claim 38 wherein sealing means are disposed between the rear wall and the side walls of the storage body in the first position of the rear wall to retain the refuse in the storage body.

40. In combination for packing refuse, a storage body having a front wall, a rear wall, a bottom wall and side walls defining an enclosure, a compaction panel movable between the front and rear walls of the storage body to pack the refuse against the rear wall of the refuse body, at least one stuffer panel disposed in cooperative relationship with the compaction panel for movement with the compaction panel between the front and rear walls of the compaction panel and movable between a first position defining a portion of the compaction panel and a second position displaced from the compaction panel toward the rear wall of the compaction panel, first hydraulic means operative to provide a movement of the compaction panel between the front and rear walls of the compaction panel, second hydraulic means operative to provide a reciprocatory movement of the stuffer panel between the first and second positions, and hydraulic circuitry means operatively associated with the first and second hydraulic means for providing controlled flows of hydraulic fluid through the first and second hydraulic means and responsive to the exertion of first particular pressures by the refuse against the compaction panel for interrupting the flow of the hydraulic fluid through the first hydraulic means to interrupt the movement of the compaction panel between the front and rear walls of the storage body and for initiating the flow of the hydraulic fluid through the second hydraulic means to provide for a reciprocatory movement of the stuffer panel between the first and second positions and responsive to the exertion by the refuse against the compaction panel of second particular pressures less than the first particular pressures for interrupting the flow of the hydraulic fluid through the second hydraulic means to interrupt the reciprocatory movement of the compaction panel between the first and second positions and for initiating the flow of the hydraulic fluid through the first hydraulic means to provide a movement of the compaction panel between the front and rear walls of the storage body.

41. The combination set forth in claim 40 wherein the second hydraulic means and the hydraulic circuitry means are operative to provide a reciprocation of the stuffer panel through more than one cycle between the first and second positions until the exertion by the refuse of the second particular pressure against the compaction panel.

42. The combination set forth in claim 40 wherein means are included in the first hydraulic means and the first hydraulic circuitry means for maintaining the compaction panel in fixed position during the operation of the second hydraulic means in providing a reciprocatory movement of the stuffer panel between the first and second positions.

43. The combination set forth in claim 42 wherein the stuffer panel is disposed relative to the compaction panel for pivotal movement upwardly and rearwardly from the first position to the second position and wherein the second hydraulic means provides such a movement of the stuffer panel.

44. The combination set forth in claim 42 wherein the hydraulic circuitry means includes means responsive to the exertion by the refuse against the stuffer panel, during the movement of the stuffer panel from the first position to the second position, of a third particular pressure greater than the first and second particular pressures for reversing the movement of the stuffer panel and wherein means are included within the hydraulic circuitry means for producing the third particular pressure at the end of the movement of the stuffer panel from the first position to the second position.

45. In combination for packing refuse, a storage body having a bottom wall, a rear wall, a front wall and side walls defining an enclosure, a compaction panel disposed within the storage panel and movable between the front and rear walls of the storage panel to pack refuse against the rear wall of the storage panel, at least one stuffer panel disposed in cooperative relationship with the compaction panel for movement with the compaction panel and movable between a first position defining a portion of the compaction panel and a second position disposed rearwardly of the compaction panel to provide an auxiliary packing of the refuse in the storage body, the rear wall of the storage body being movable relative to the side walls of the storage body from a first position contiguous to the side walls of the storage body to a second position spaced from the side walls of the storage body to provide for a removal by the compaction panel of the refuse in the storage body, sealing means disposed in cooperative relationship with the rear wall and the side walls of the storage body in the first position of the storage body for sealing the rear wall and the side walls to define the enclosure, first means operatively associated with the compaction panel for providing a controlled movement of the compaction panel between the front and rear walls of the storage body, second means operatively associated with the stuffer panel for providing a reciprocatory movement of the stuffer panel between the first and second positions, third means operatively associated with the first and second means and responsive to the exertion of a first particular pressure by the refuse against the compaction panel for interrupting any operation of the first means in moving the compaction panel and for initiating an operation of the second means in producing a reciprocatory movement of the stuffer panel and responsive to the exertion by the refuse against the compaction panel of a second particular pressure less than the first particular pressure for interrupting the operation of the second means in producing a reciprocatory movement of the stuffer panel and for initiating an operation of the first means in producing a movement of the compaction panel between the front and rear walls of the storage body, and fourth means operatively associated with the rear wall of the storage body for moving the rear wall between the first and second positions.

46. The combination set forth in claim 45 wherein the rear wall includes a particular portion of the bottom wall and a particular portion of the side walls and wherein the particular portion of the bottom wall and the particular portions of the side walls define a well for receiving and retaining fluid in the refuse.

47. The combination set forth in claim 46 wherein the third means includes means for clamping the rear wall of the storage body to the side walls of the storage body upon a movement of the rear wall to the first position and to provide for a sealing of the rear wall, the side walls and the bottom wall by the sealing means and for releasing the rear wall from the side walls for movement of the rear wall to the second position.

48. The combination set forth in claim 46 wherein the third means includes means for automatically latching the rear wall of the storage body to the side walls upon a movement of the rear wall to the first position and for automatically unlatching the rear wall of the storage body from the side walls prior to a movement of the rear wall to the second position.

49. A refuse compactor comprising:

a refuse storage body;

a compaction panel movable with said storage body to give refuse within said body an initial pack;

a stuffer panel movable within said body to give refuse in said body a secondary pack, and control means to alternately move said compaction panel and said stuffer panel in compacting refuse within said body by movement of the compaction panel and then actuation of said stuffer panel in sequentially packing the refuse through movement of said panels, said refuse storage body having an upper and a lower portion, and said stuffer panel providing to said refuse a secondary pack in a direction which provides a substantial upwardly directed packing force to said refuse, whereby the gravitational effect of increased densification of the refuse in the lower portion of the refuse storage body is offset by the upwardly directed packing force provided by said secondary pack.

50. A refuse compactor comprising:

a refuse storage body;

a compaction panel movable within said storage body in a substantially horizontal direction to give refuse within said body an initial pack;

a stuffer panel movable within said body to give refuse in said body a secondary pack, the stuffer panel being movable in a direction having a substantial upward component, and control means to alternately move said compaction panel and said stuffer panel in compacting refuse within said body by movement of the compaction panel and then actuation of said stuffer panel in sequentially packing the refuse through movement of said panels, said compaction panel being movable in said substantially horizontal direction, and said stuffer panel being movable in a direction to exert a secondary packing force having the substantial upward component, whereby movement of said stuffer panel provides more uniform densification of refuse within said body and counteracts the normal tendency of the refuse to be more dense in the lower portion of the storage body.

51. The refuse compactor of claim 50 wherein, said stuffer panel has a compaction surface which is substantially coextensive with a compaction surface of said compaction panel when said stuffer panel is in a retracted position.

52. The refuse compactor of claim 51 wherein said stuffer panel is pivotally mounted on said compaction panel, and the compaction surface of said stuffer panel is rotated upwardly and rearwardly with respect to the compaction surface of said compaction panel when said stuffer panel is moved from a retracted to an extended position.

53. The refuse compactor of claim 52 wherein the movement of said stuffer panel in giving the refuse a secondary pack applies a higher packing pressure to the refuse than the packing pressure applied to the refuse through movement of said compaction panel.

54. The refuse compactor of claim 53 wherein said compaction panel has a larger compaction surface than said stuffer panel.

55. The refuse compactor of claim 54 wherein movement of said stuffer panel to an extended position forms a cavity in the refuse contacted by the compaction surface of said stuffer panel and the formation of said cavity reduces the area on the compaction surface of said compaction panel which is contacted by compacted refuse.

56. The refuse compactor of claim 55 including a plurality of stuffer panels pivotally mounted on said compaction panel;

said stuffer panels being positioned in a spaced-apart relation on said compaction panel;

the movement of said stuffer panels to an extended position forming a plurality of cavities in the refuse contacted by the compaction surfaces of said stuffer panels;

said cavities being positioned in a spaced-apart relation in said refuse corresponding to the spaced-apart relation of said stuffer panels on said compaction panel;

said cavities being separated by surfaces on said compacted refuse which are raised with respect to said cavities, and said raised surfaces being formed through contact of the refuse with the compaction surface of said compaction panel.

57. The refuse compactor of claim 56 wherein two stuffer panels are pivotally mounted in a spaced-apart relation on said compaction panel.

58. The refuse compactor of claim 50 wherein the movement of said stuffer panel in giving the refuse a secondary pack applies a higher packing pressure to the refuse than the packing pressure applied to the refuse through movement of said compaction panel.

59. The refuse compactor of claim 58 wherein said compaction panel has a larger compaction surface than said stuffer panel.

60. In the combination set forth in claim 50, the control means including first means operatively coupled to the compaction panel for providing a movement of the compaction panel in a direction for compacting the refuse and including second means operatively coupled to the stuffer panel for providing a movement of the stuffer panel in a direction for providing a further compaction of the refuse, and the stuffer panel being attached to the compaction panel at an upper position on the compaction panel for pivotable movement upwardly about such attachment position as a fulcrum and the second means providing the pivotal movement of the second means about the attachment position as a fulcrum.

61. In combination in a refuse equipment, a refuse storage body, a compaction panel movable within the storage body, first means operatively coupled to the compaction panel for operating the compaction panel to provide a compacting of refuse within the storage body to a first packing pressure, second means disposed within the refuse body and operatively coupled to the compaction panel for movement with the compaction panel in accordance with the operation of the first means and for further movement relative to the compaction panel in a direction for providing a further packing of the refuse at localized positions within the storage body, third means operatively coupled to the second means in providing an operation of the second means in obtaining a further packing of the refuse in the storage body to a second packing pressure greater than the first packing pressure, and fourth means operatively coupled to the first and third means for initially obtaining a movement in the storage body of the compaction panel by the first means until the production of the first packing pressure in the refuse in the storage body and for thereafter obtaining a movement in the storage body of the second means by the third means until the production of the second packing pressure of the refuse in the storage body, the compaction panel being provided with dimensions to occupy a lateral cross-sectional area of the storage body and being movable in a longitudinal direction in the packer panel to provide a packing of the refuse in the storage body and the second means being movable longitudinally in the storage body in the same direction as the prior movement of the compaction panel and being provided with a smaller lateral cross-sectional area than the compaction panel to provide packing of the refuse at the localized positions in the storage body, the second means being movable in a path to provide an upward component to the refuse during the longitudinal movement of the refuse to enhance the packing density provided by the second means for the refuse in the storage body.

62. In combination in refuse equipment, a refuse storage body, a compaction panel movable within the storage body for compacting the refuse within the storage body, first means operatively coupled to the compaction panel for moving the compaction panel in a first direction to provide a compaction of refuse within the storage body, second means operatively coupled to the compaction panel for moving at least a portion of the compaction panel in the first direction to provide a compaction of refuse within the storage body to a second packing pressure greater than the first packing pressure, and third means operatively coupled to the second and third means for initially obtaining the movement of the compaction panel in the first direction until the production of the first packing pressure in the refuse in the storage body and for thereafter obtaining the movement of at least the portion of the compaction panel in the first direction until the production of the second packing pressure in the refuse in the storage body, at least the portion of the compaction panel is pivotable relative to the storage body in the first direction about an upper position in the storage body as a fulcrum and wherein the second means are operative to provide the pivoting of at least the portion of the compaction panel in the first direction about the upper position as a fulcrum.

63. The combination set forth in claim 62 wherein the compaction panel is movable in the rearward direction to provide a packing of the refuse in the storage body, and at least the portion of compaction panel is pivotable in the rearward direction to provide the refuse with an upward component of movement during the rearward packing provided by the pivotable movement of at least the portion of the compaction panel and wherein fourth means are responsive to the production of the second packing pressure in the refuse in the storage body for initiating a new cycle of operation to initially move the compaction panel in the refuse body in the rearward direction until the production of the first packing pressure of the refuse in the storage body against the compaction panel and to subsequently move at least the portion of the compaction panel in the rearward direction until the production of the second packing pressure of the refuse in the storage body against the compaction panel.

64. In combination in refuse equipment, a storage body for the refuse, means providing an opening into the storage body, a compaction panel movable longitudinally in the storage body to provide a compaction of refuse in accordance with such longitudinal movement, stuffer means operatively coupled to the compaction panel and movable relative to the compaction panel in the longitudinal direction to provide a localized packing of the refuse in the storage body and thereafter movable in the opposite direction relative to the compaction panel, first hydraulic means operatively coupled to the compaction panel to provide a movement of the compaction panel in the longitudinal direction until the imposition of a first packing pressure against the compaction panel by the refuse in the storage body, second hydraulic means operatively coupled to the stuffer means to provide a movement of the stuffer means in the longitudinal direction until the imposition of a second packing pressure against the stuffer means by the refuse in the storage body where the second packing pressure is greater than the first packing pressure and for thereafter providing a movement of the stuffer means in the opposite direction to retract the stuffer means, third hydraulic means operatively coupled to the first and second hydraulic means for sequencing the first and second hydraulic means through a plurality of cycles of operation for the imposition of the first packing pressure against the compaction panel and then the imposition of the second packing pressure against the stuffer means until the imposition of the second packing pressure against the stufer means and for thereafter providing a movement of the stuffer means in the opposite direction, the stuffer means being operatively coupled to the compaction panel for an upward component of movement simultaneously with its rearward movement to pack the refuse in the storage body upwardly while the refuse is being packed rearwardly.

65. In the combination set forth in claim 64, the compaction panel being tilted progressively in the rearward direction with progressively lower positions on the compaction panel during the rearward movement of the stuffer means and the stuffers means being pivotable relative to the compaction panel about an upper position in the compaction panel as a fulcrum.

66. In the combination set forth in claim 65, the stuffer means extending downwardly from the pivot position on the compaction panel to a position near the bottom of the compaction panel and the compaction panel being tilted rearwardly at a greater angle below the fulcrum position on the stuffer panel than adjacent to or above the fulcrum position of the packer panel to provide an upward movement of the refuse below the stuffer means to be packed by the stuffer means.

67. In the combination set forth in claim 66, the stuffer means being coextensive with the compaction panel in the retracted position of the stuffer means.

68. In the combination set forth in claim 65, the stuffer means constituting at least one stuffer panel having a pie-shaped configuration and an arcuate lower surface and the compaction panel having an arcuate surface in juxtaposition to the arcuate surface on the stuffer panel.

69. A refuse compactor comprising:

a refuse storage body having a rear wall, a front wall, a bottom wall and side walls defining an enclosure;

a compaction panel movable in a rearward direction within said storage body to give refuse with said storage body an initial pack of a first particular maximum pressure against the rear wall of the storage body;

at least one stuffer panel defining a portion of the compaction panel in a first position and movable within said body relative to said compaction panel in a rearward direction to a second position to give the refuse in said body a secondary pack, of a second particular maximum pressure greater than the first particular maximum pressure, against the rear wall of the storage body, and control means operatively coupled to said compaction panel and said stuffer panel to move said compaction panel in the rearward direction, with the stuffer panel in the first position, until the production of the first particular maximum pressure against the compaction panel and then to move said stuffer panel between the first and second positions, with the compaction panel stationary, until the production of the second particular maximum pressure against the compaction panel and then to move the compaction panel from the the stationary position with the stuffer panel in the first position, the control means being operative to provide the second particular pressure with a lesser magnitude than the first particular pressure, said stuffer panel having a compaction surface which is substantially coextensive with a compaction surface of said compaction panel when said stuffer panel is in the first position and wherein the control means includes first hydraulic drive means responsive to the introduction of hydraulic fluid for driving the compaction panel and second hydraulic drive means responsive to the introduction of hydraulic fluid for driving the stuffer panel and wherein the control means also includes hydraulic circuitry means having a supply of hydraulic fluid operatively associated with the compaction panel for introducing the hydraulic fluid to the first hydraulic drive means to drive the compaction panel until the production of the first particular pressure by the refuse against the compaction panel and for thereafter introducing the hydraulic fluid to the second hydraulic drive means to drive the compaction panel until the production of the second particular pressure by the refuse against the stuffer panel.

70. The refuse compactor of claim 69 wherein the hydraulic circuitry means is responsive to the exertion by the refuse against the compaction panel of a third particular pressure less than the first particular pressure during the rearward movement of the stuffer panel to introduce the hydraulic fluid to the first hydraulic drive means for instituting a further rearward movement of the compaction panel.

* * * * *